US008582190B2

(12) United States Patent
Kusaka et al.

(10) Patent No.: US 8,582,190 B2
(45) Date of Patent: Nov. 12, 2013

(54) TWO-DIMENSIONAL SCANNING DEVICE

(75) Inventors: Yusuke Kusaka, Osaka (JP); Seiji Hamano, Hyogo (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 13/389,403

(22) PCT Filed: Mar. 3, 2011

(86) PCT No.: PCT/JP2011/001241
§ 371 (c)(1),
(2), (4) Date: Feb. 7, 2012

(87) PCT Pub. No.: WO2011/135771
PCT Pub. Date: Nov. 3, 2011

(65) Prior Publication Data
US 2012/0134000 A1    May 31, 2012

(30) Foreign Application Priority Data
Apr. 30, 2010    (JP) .................... 2010-104676

(51) Int. Cl.
*G02B 26/08*    (2006.01)
(52) U.S. Cl.
USPC .................................... 359/201.1

(58) Field of Classification Search
USPC ................. 359/201.1, 201.2, 202.1
See application file for complete search history.

(56) References Cited

U.S. PATENT DOCUMENTS

| 2002/0138119 A1* | 9/2002 | Angeley et al. ............. 607/88 |
| 2004/0075914 A1 | 4/2004 | Yamamoto |

FOREIGN PATENT DOCUMENTS

| JP | 2709928 | 10/1997 |
| JP | 2004-138822 | 5/2004 |
| JP | 2007-253203 | 10/2007 |
| JP | 2010-082663 | 4/2010 |

* cited by examiner

*Primary Examiner* — Euncha Cherry
(74) *Attorney, Agent, or Firm* — Hamre, Schumann, Mueller & Larson, P.C.

(57) ABSTRACT

A two-dimensional scanning device possesses: a light source for emitting light; a mirror for scanning on a test surface in the X direction; a mirror for scanning on the test surface in the Y direction; a lens which has different powers in relation to the X direction and the Y direction; and a lens which has different powers in relation to the X direction and the Y direction. The mirrors are arranged between the light source and a lens group including the lenses.

11 Claims, 23 Drawing Sheets

FIG. 5

| Surface Number | Effective Diameter | RX | RY | Distance | Index of Refraction |
|---|---|---|---|---|---|
| 1 | 6.2 | inf | inf | 10.00 | (mirror) |
| 2 | 8.0 | inf | inf | 46.14 | (mirror) |
| 3 | 28.2 | 61.634 | -790.485 | 10.00 | 1.587 |
| 4 | 29.7 | -60.209 | -48.014 | 13.95 | 1.000 |
| 5 | 29.6 | -23.504 | 150.275 | 10.00 | 1.587 |
| 6 | 31.2 | -30.400 | -243.223 | 45.00 | 1.000 |

FIG. 6

|  | Calculation Results |
|---|---|
| Expression (1) | 0.62 |
| Expression (2) | 2.39 |
| Expression (3) | 0.83 |
| Expression (4) | 0.74 |
| Expression (5) | 0.86 |
| Expression (6) | 0.78 |
| Expression (7) | 1.1 |
| Expression (8) | 0.00177 |

FIG. 12

| Surface Number | Effective Diameter | RX | RY | Distance | Index of Refraction |
|---|---|---|---|---|---|
| 1 | 6.2 | inf | inf | 10.00 | (mirror) |
| 2 | 8.2 | inf | inf | 45.52 | (mirror) |
| 3 | 30.2 | 117.013 | inf | 7.00 | 1.587 |
| 4* | 31.5 | -49.381 | inf | 1.00 | 1.000 |
| 5 | 32.3 | inf | 83.090 | 8.00 | 1.587 |
| 6* | 32.6 | inf | -50.180 | 52.36 | 1.000 |

| Aspherical Coefficient | k | A | B | C | D |
|---|---|---|---|---|---|
| RX4 | -0.460 | 8.247E-07 | 7.193E-09 | -7.036E-11 | 2.599E-13 |
| RY6 | 0.109 | 2.266E-06 | 3.583E-10 | 2.221E-11 | -1.359E-13 |

FIG. 13

| | Calculation Results |
|---|---|
| Expression (1) | 1.00E-29 |
| Expression (2) | 1.84E+28 |
| Expression (3) | 0.56 |
| Expression (4) | 0.96 |
| Expression (5) | 0.89 |
| Expression (6) | 1 |
| Expression (7) | 1.1 |
| Expression (8) | 0.00171 |

FIG. 19

| Surface Number | Effective Diameter | RX | RY | Distance | Index of Refraction |
|---|---|---|---|---|---|
| 1 | 6.2 | inf | inf | 5.00 | (mirror) |
| 2 | 8.0 | inf | inf | 47.47 | (mirror) |
| 3 | 28.2 | 64.528 | 2064.703 | 10.00 | 1.587 |
| 4 | 29.7 | −54.362 | −50.477 | 12.76 | 1.000 |
| 5 | 29.6 | −22.276 | 146.612 | 10.00 | 1.587 |
| 6 | 31.2 | −28.602 | −322.768 | 45.00 | 1.000 |

FIG. 20

| | Calculation Results |
|---|---|
| Expression (1) | 0.61 |
| Expression (2) | 2.39 |
| Expression (3) | 1.23 |
| Expression (4) | 0.74 |
| Expression (5) | 0.87 |
| Expression (6) | 0.78 |
| Expression (7) | 1.1 |
| Expression (8) | 0.000812 |

FIG. 26

| Surface Number | Effective Diameter | RX | RY | Distance | Index of Refraction |
|---|---|---|---|---|---|
| 1 | 6.2 | inf | inf | 50.00 | (mirror) |
| 2 | 16.0 | inf | inf | 39.10 | (mirror) |
| 3 | 29.4 | 47.812 | −42.499 | 10.00 | 1.587 |
| 4 | 30.6 | −63.011 | −34.505 | 7.71 | 1.000 |
| 5 | 29.8 | −35.913 | 178.203 | 10.00 | 1.587 |
| 6 | 31.0 | −122.380 | −69.044 | 60.00 | 1.000 |

FIG. 27

| | Calculation Results |
|---|---|
| Expression (1) | 0.22 |
| Expression (2) | 1.05 |
| Expression (3) | 0.48 |
| Expression (4) | 0.99 |
| Expression (5) | 0.8 |
| Expression (6) | 0.56 |
| Expression (7) | 1.41 |
| Expression (8) | 0.00649 |

FIG. 28A
FIG. 28B
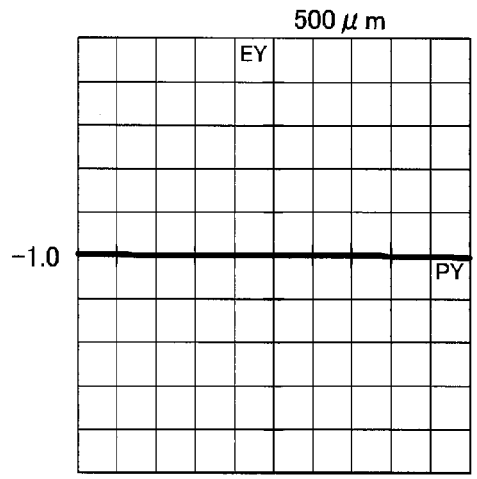
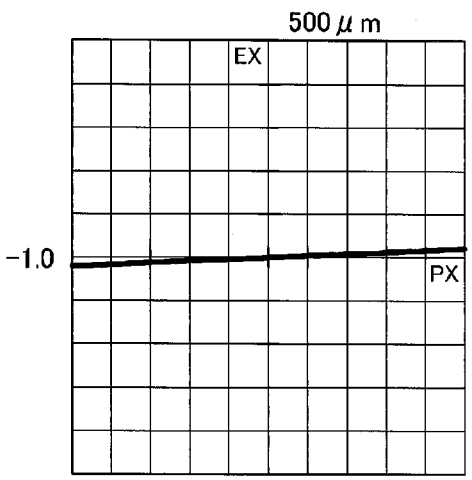
FIG. 29A
FIG. 29B
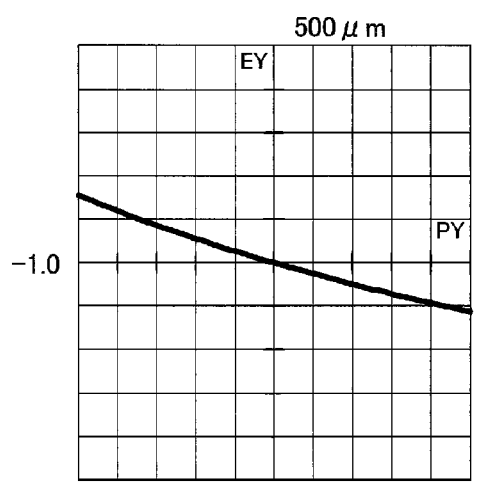
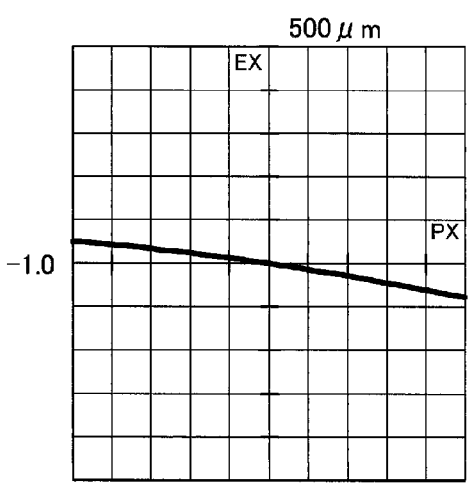

TWO-DIMENSIONAL SCANNING DEVICE

TECHNICAL FIELD

The present invention relates to a two-dimensional scanning device that two-dimensionally scans a test surface.

BACKGROUND ART

It is generally known that a scanning optical system without distortion on a flat test surface (or a flat irradiation surface) is achieved by designing the scanning optical system like an optical system having telecentricity on the test surface side (i.e., image-side).

For example, an art related to a two-dimensional scanning optical system is disclosed in Patent Literature 1. In this art, the two-dimensional scanning optical system includes a cylindrical lens having a power only in a cross section along a main-scanning direction and a cylindrical lens having a power only in a cross section along a sub-scanning direction. The two cylindrical lenses are used so that telecentricity can be achieved in cross sections of the image-side space along the main-scanning direction and the sub-scanning direction.

In particular, as shown in FIG. 30, light emitting from a light source 41 passes through a collimator lens 42 and travels to a polygon mirror 43. The light traveled to the polygon mirror 43 reflects off the polygon mirror 43 so as to scan in the sub-scanning direction. The light reflected off the polygon mirror 43 so as to scan in the sub-scanning direction travels through a cylindrical lens 44 having a power only in a cross section along the sub-scanning direction, and travels to a polygon mirror 45. The light traveled to the polygon mirror 45 reflects off the polygon mirror 45 so as to scan in the main-scanning direction. The light reflected off the polygon mirror 45 so as to scan in the main-scanning direction travels through a cylindrical lens 46 having a power only in a cross section along the main-scanning direction, and travels to a scanning surface 47.

In this configuration, the cylindrical lens is placed so that the center of the polygon mirror can be located at a focal point on the object side of the cylindrical lens.

With this configuration, telecentricity is achieved in cross sections of the image-side space along the main-scanning direction and the sub-scanning direction.

In other words, the two-dimensional scanning optical system has a combination of the polygon mirror and the cylindrical lens, which has the power only in the cross section along the scanning direction of the polygon mirror, with respect to the main-scanning direction and the sub-scanning direction. Moreover, the cylindrical lenses and polygon mirrors are arranged in series. Thus, the two-dimensional scanning optical system can two-dimensionally scan and have telecentricity on the scanning 47 side.

CITATION LIST

Patent Literature
Patent Literature 1: Japanese Patent No. 2709928

SUMMARY OF INVENTION

Technical Problem

In the related art, however, it is necessary to arrange the polygon mirror 43, the cylindrical lens 44, the polygon mirror 45, and the cylindrical lens 46 in series, in order to regard the two-dimensional scanning optical system as a two-dimensional telecentric optical system. Thus, the optical system has a very long optical path length and requires a large installation area.

The present invention has been devised to solve the problem. An object of the present invention is to provide a compact two-dimensional scanning device which obtains a two-dimensional image with little distortion and a high-precision resolution by two-dimensional scanning and has a simple configuration.

Solution to Problem

In order to achieve the object, a two-dimensional scanning device according to the present invention scans a test surface in a first direction and a second direction orthogonal to the first direction, the two-dimensional scanning device including: a light source; a scanning optical system to scan the test surface in the first direction and the second direction with light emitting from the light source; a first lens having different powers in relation to the first direction and the second direction; and a second lens having different powers in relation to the first direction and the second direction, wherein the scanning optical system is placed between the light source and a lens group including the first lens and the second lens, and following Expressions (1) and (2) are satisfied in the two-dimensional scanning device:

$$|f1x/f1y| < 1 \qquad (1)$$

$$|f2x/f2y| > 1 \qquad (2)$$

where f1x is a focal length of the first lens when the scanning direction is the first direction, f1y is a focal length of the first lens when the scanning direction is the second direction, f2x is a focal length of the second lens when the scanning direction is the first direction, and f2y is a focal length of the second lens when the scanning direction is the second direction.

Advantageous Effects of Invention

According to the present invention, a compact two-dimensional scanning device which obtains a two-dimensional image with little distortion by two-dimensional scanning and has a high-resolution and a simple configuration can be achieved.

BRIEF DESCRIPTION OF DRAWINGS

FIG. 5 is a table of specifications of the optical elements of the two-dimensional scanning device according to the first embodiment.

FIG. 6 is a table of calculation results of expressions for defining the design conditions of the two-dimensional scanning device according to the first embodiment.

FIG. 12 is a table of specifications of the optical elements of the two-dimensional scanning device according to the second embodiment.

FIG. 13 is a table of calculation results of expressions for defining the design conditions of the two-dimensional scanning device according to the second embodiment.

FIG. 19 is a table of specifications of the optical elements of the two-dimensional scanning device according to the third embodiment.

FIG. 20 is a table of calculation results of expressions for defining the design conditions of the two-dimensional scanning device according to the third embodiment.

FIG. 26 is a table of specifications of the optical elements of the two-dimensional scanning device according to the fourth embodiment.

FIG. 27 is a table of calculation results of expressions for defining the design conditions of the two-dimensional scanning device according to the fourth embodiment.

FIG. 28A is a lateral aberration diagram at coordinate [0,0] on the test surface scanned in the Y direction by the two-dimensional scanning device according to the fourth embodiment.

FIG. 28B is a lateral aberration diagram at coordinate [0,0] on the test surface scanned in the X direction by the two-dimensional scanning device according to the fourth embodiment.

FIG. 29A is a lateral aberration diagram at coordinate [−10,−10] on the test surface scanned in the Y direction by the two-dimensional scanning device according to the fourth embodiment.

FIG. 29B is a lateral aberration diagram at coordinate [−10,−10] on the test surface scanned in the X direction by the two-dimensional scanning device according to the fourth embodiment.

DESCRIPTION OF EMBODIMENTS

Figure 1A:
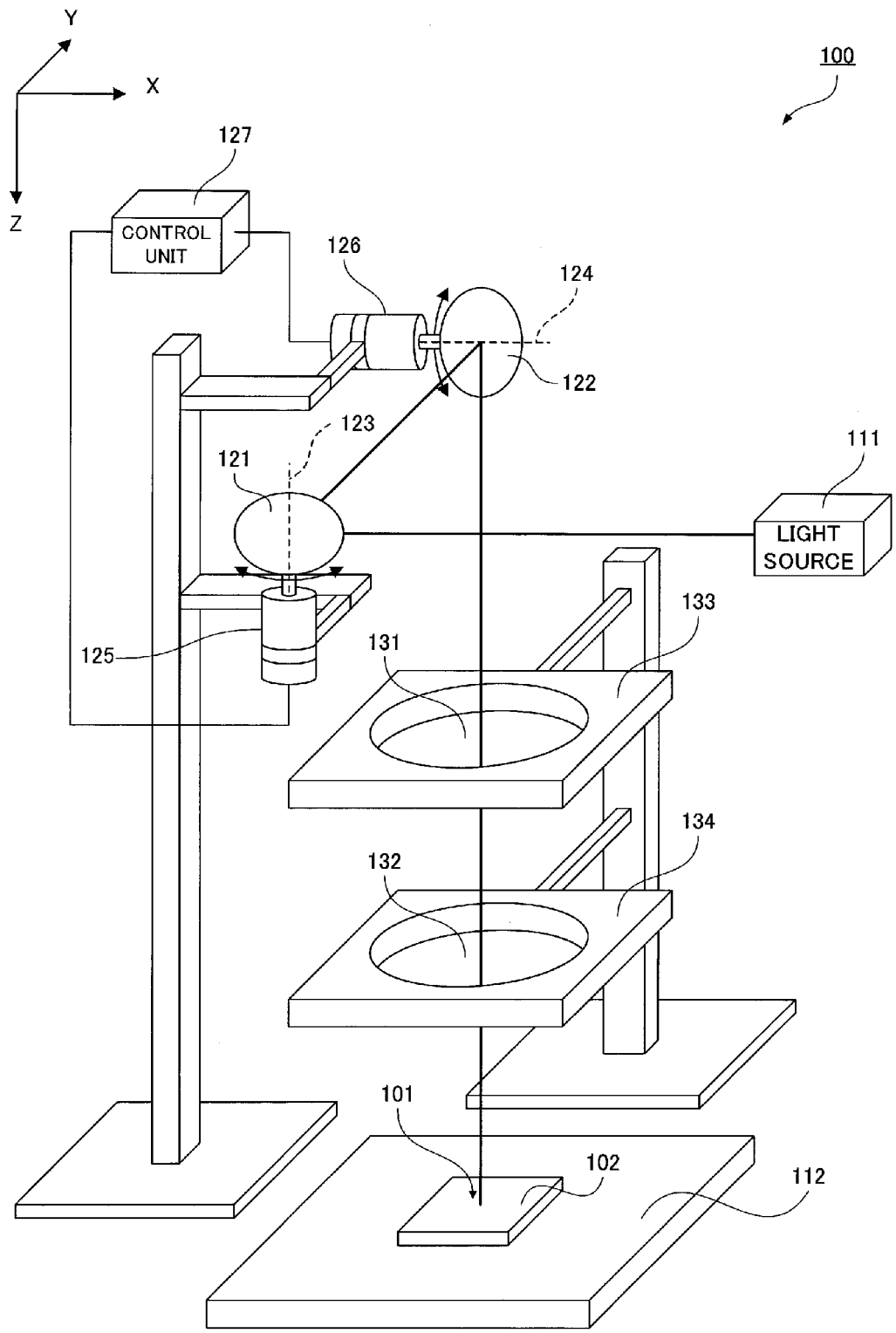
FIG. 1A is a schematic diagram showing a two-dimensional scanning device according to a first embodiment of the present invention.

The following will describe embodiments of the present invention in accordance with the accompanying drawings. In the following explanation, the same configurations are indicated with the same reference numerals and the explanation thereof is optionally omitted.

(First Embodiment)

A first embodiment of the present invention will be described below in accordance with the accompanying drawings.

<Two-Dimensional Scanning Device 100>

As shown in FIG. 1A, a two-dimensional scanning device 100 two-dimensionally scans a test surface 101. In this configuration, the two-dimensional scanning device 100 includes a light source 111, mirrors 121 and 122, and lenses 131 and 132.

The test surface 101 is the top surface of a test object 102 placed on a stage 112. The test object 102 is, for example, a patterned display panel. The mirror 121 is attached on a rotation axis 123 of a servo driver 125. The mirror 122 is attached on a rotation axis 124 of a servo driver 126. The lens 131 is held with a lens holder 133. The lens 132 is held with a lens holder 134. The servo driver 125 is placed so that the rotation axis 123 will be parallel to the Z axis. The servo driver 126 is placed so that the rotation axis 124 will be parallel to the X axis. The servo drivers 125 and 126 are separately controlled by a control unit 127. The control unit 127 controls the rotation angle of the rotation axis 123 to adjust the orientation of the mirror 121. Furthermore, the control unit 127 controls the rotation angle of the rotation axis 124 to adjust the orientation of the mirror 122.

In the following illustration of the two-dimensional scanning device 100, the test object 102, the stage 112, the servo drivers 125 and 126, the control unit 127, the lens holders 133 and 134 are omitted for the sake of simplification. The light source 111 is illustrated as a black circle.

Figure 1B:
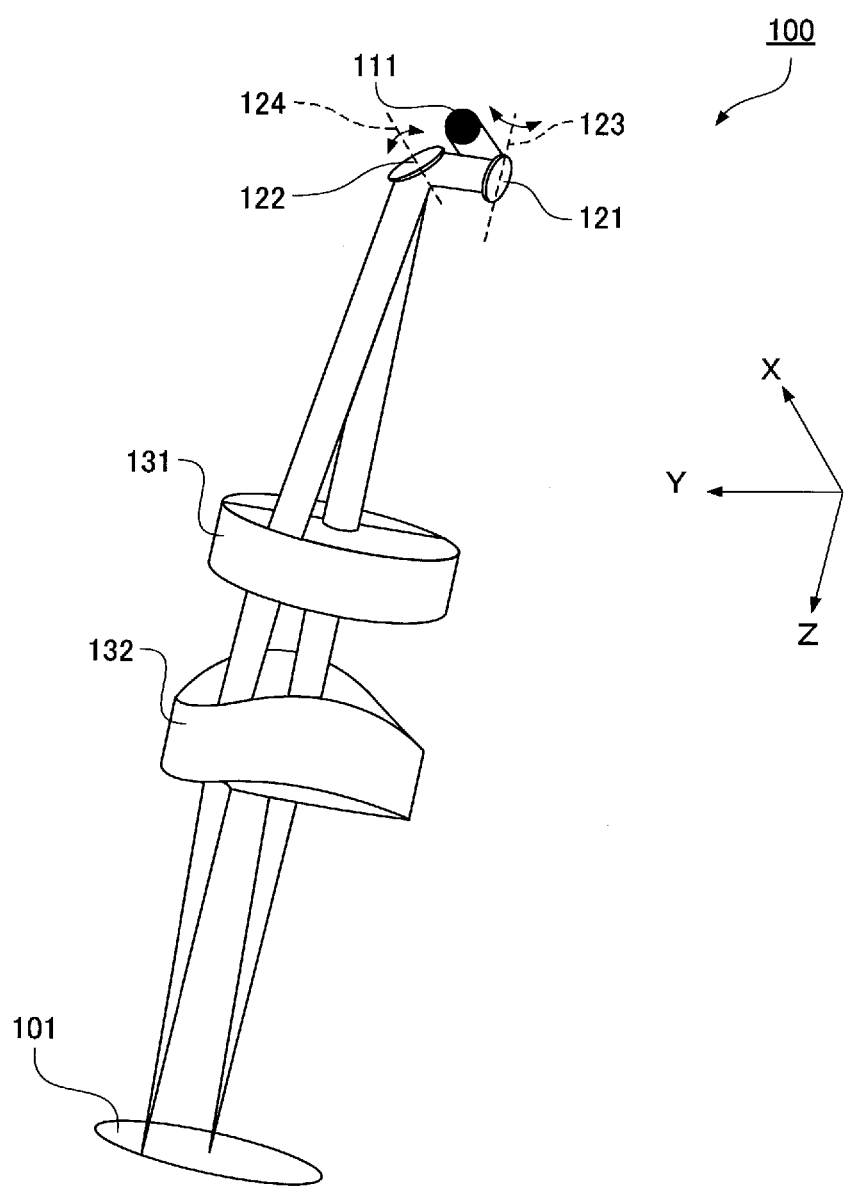
FIG. 1B is a bird's eye view showing the two-dimensional scanning device according to the first embodiment.

The following will describe the traveling light from the light source 111 to the test surface 101 in the two-dimensional scanning device 100. As shown in FIG. 1B, light emitting from the light source 111 is reflected off the mirror 121. The light reflected off the mirror 121 is reflected off the mirror 122. The light reflected off the mirror 122 passes through the lens 131. The light through the lens 131 passes through the lens 132. The light through the lens 132 irradiates the test surface 101.

In the X direction, a direction from the light source 111 to the mirror 121 is a negative direction. In the Y direction, a direction from the mirror 121 to the mirror 122 is a negative direction. In the following explanation, the center of the test surface 101 serves as an origin unless otherwise specified. A line connecting the center of the test surface 101 and the center of the mirror 122 is the optical axis of the optical system including the lenses 131 and 132.

<Light Source 111>

The light source 111 emits light with a wavelength of 1310 nm in parallel with the X axis.

<Mirrors 121 and 122>

The mirror 121 is a galvanometer mirror that refracts light so as to scan the test surface 101 in the X direction (first direction). The mirror 122 is a galvanometer mirror that refracts light so as to scan the test surface 101 in the Y direction (second direction). The center of the mirror 121 and the center of the mirror 122 are located on the same axis. The mirror 121 is placed near the light source 111. The mirror 122 is placed near the lens 131. The mirrors 121 and 122 are arranged so that the mirrors can rotate without colliding with each other.

Scanning on the test surface 101 with the mirrors 121 and 122 will be described below. Light emitting from the light source 111 is reflected off the mirror 121. The light reflected off the mirror 121 is reflected off the mirror 122. The mirror 121 rotates within a predetermined angle with respect to the rotation axis 123, so that the test surface 101 is scanned in the X direction. The mirror 122 rotates within a predetermined angle with respect to the rotation axis 124, so that the test surface 101 is scanned in the Y direction.

<Lenses 131 and 132>

The lens 131 is a toroidal lens having different curvatures and different refractive powers (powers) in relation to the X direction and the Y direction. The lens 132 is a toroidal lens having different curvatures and different refractive powers (powers) in relation to the X direction and the Y direction. The orientation of the lens 131 is adjusted so that the optical axis of the lens 131 will be parallel to the Z axis. The orientation of the lens 132 is adjusted so that the optical axis of the lens 132 will be parallel to the Z axis. The optical axes of the lenses 131 and 132 are the same axis. The lens 131 is placed near the mirror 122. The lens 132 is placed near the test surface 101. The light reflected off the mirror 122 enters the lens 131. The light exiting from the lens 131 enters the lens 132.

Figure 2:
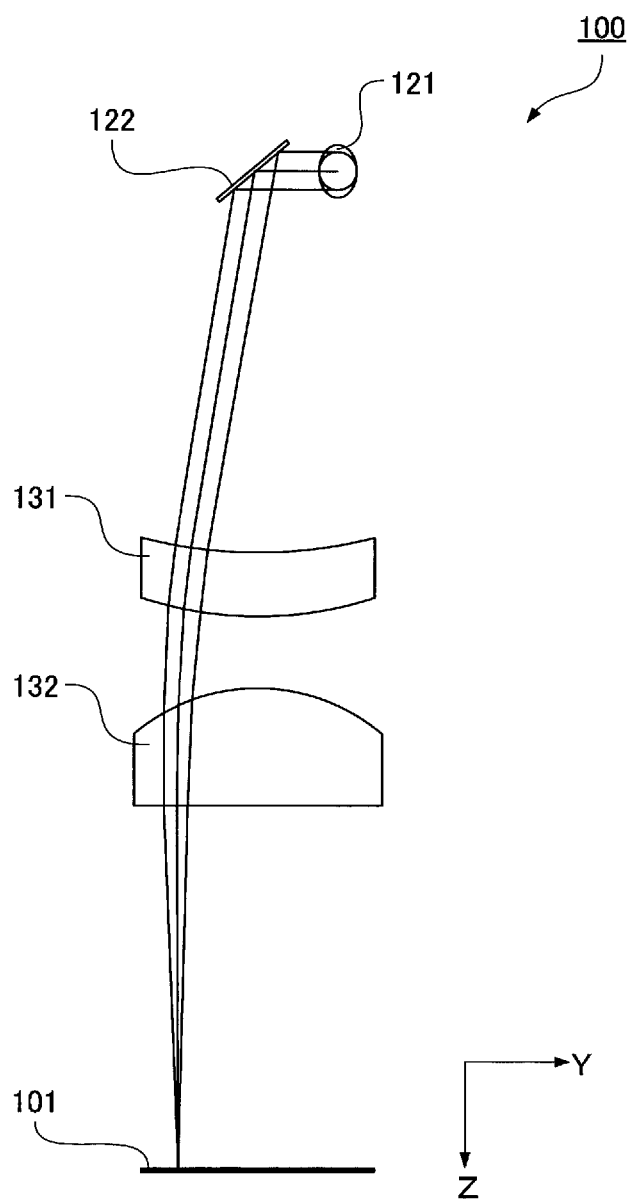
FIG. 2 shows the two-dimensional scanning device viewed in the X direction according to the first embodiment.
Figure 3:
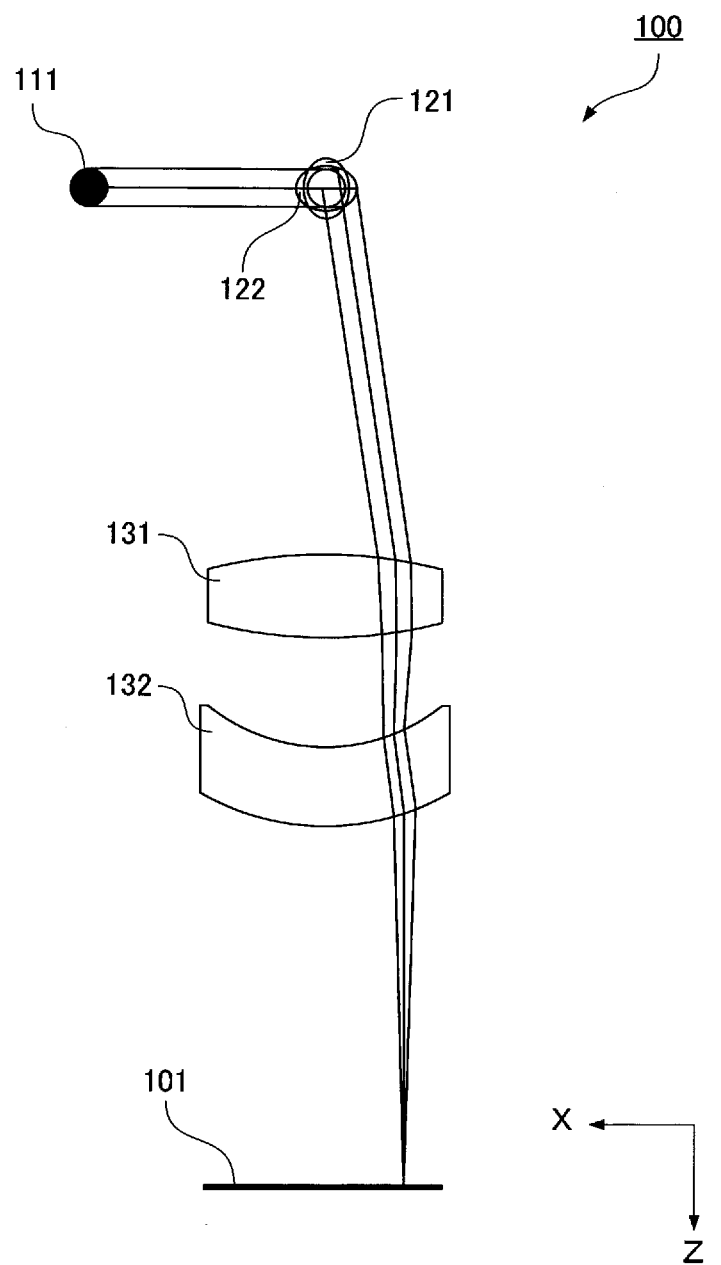
FIG. 3 shows the two-dimensional scanning device viewed in the Y direction according to the first embodiment.

As shown in FIGS. 2 and 3, the entrance surface of the lens 131 is curved convexly (positive) in the X direction and is curved concavely (negative) in the Y direction. With respect to the entrance surface of the lens 131, the curvature in the X direction is larger than the curvature in the Y direction. The exit surface of the lens 131 is curved concavely (negative) in the X direction and is curved concavely (negative) in the Y direction. With respect to the exit surface of the lens 131, the curvature in the Y direction is larger than the curvature in the X direction. The entrance surface of the lens 132 is curved concavely (negative) in the X direction and is curved convexly (positive) in the Y direction. With respect to the entrance surface of the lens 132, the curvature in the X direction is larger than the curvature in the Y direction. The exit surface of the lens 132 is curved concavely (negative) in the X direction and is curved concavely (negative) in the Y direction. With respect to the exit surface of the lens 132, the curvature in the X direction is larger than the curvature in the Y direction.

<Design Conditions>

The following will describe the design conditions of optical elements comprising the two-dimensional scanning device 100.

In the present embodiment, a lens group including the two toroidal lenses is used. Thus, with a simple configuration, even if the test surface 101 is scanned in the X direction and the Y direction, telecentricity is overall obtained the scanning-plane side (image-side).

In general, in order to obtain telecentricity on a scanning-plane side in a scanning optical system, the focal length of a lens with respect to a scanning-plane side has to be equal to a distance from the center of a scanning mirror to the principal point of a lens with respect to a light source side. This point will describe with the schematic diagrams of FIGS. 4A and 4B.

Figure 4A:
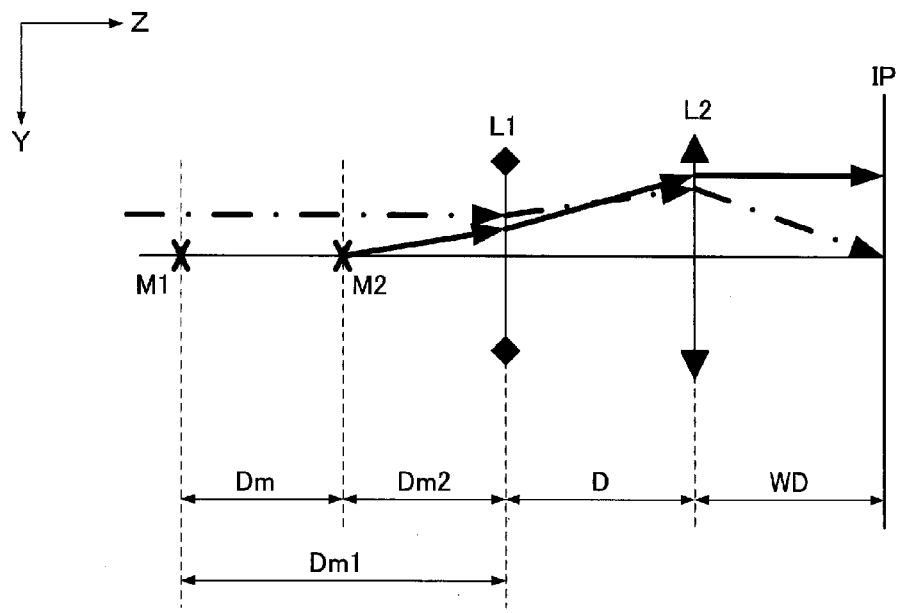
FIG. 4A is a ray diagram of scanning in the Y direction by the two-dimensional scanning device according to the first embodiment.
Figure 4B:
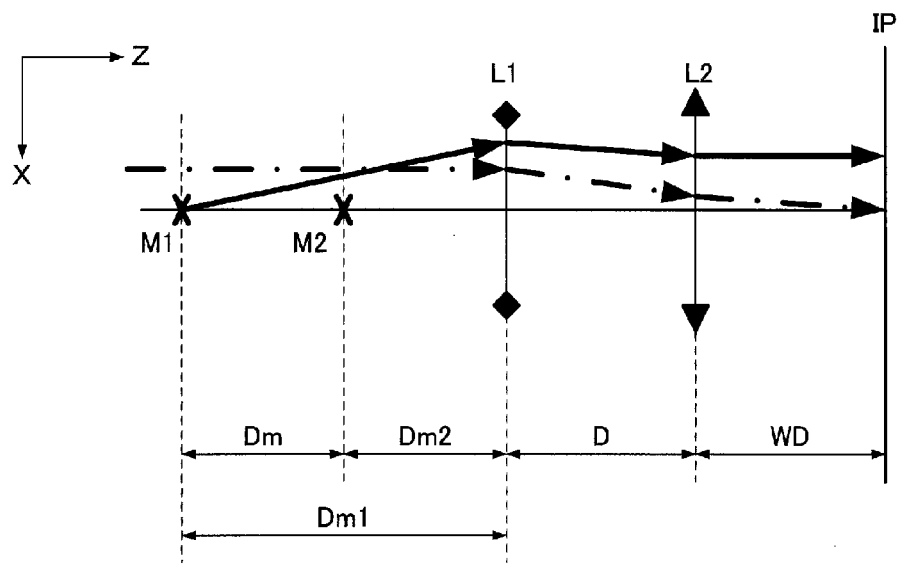
FIG. 4B is a ray diagram of scanning in the X direction by the two-dimensional scanning device according to the first embodiment.

In this example, a scanning optical system includes a scanning mirror M1 for scanning in the X direction, a scanning mirror M2 for scanning in the Y direction, a toroidal lens L1, and a toroidal lens L2. FIG. 4A shows traveling light with respect to the scanning direction (Y direction) of the scanning mirror M2. FIG. 4B shows traveling light with respect to the scanning direction (X direction) of the scanning mirror M1.

In FIGS. 4A and 4B, a first optical path indicated with a dotted line is a light beam passing through the toroidal lenses L1 and L2 from a point source of light at infinity and forming an image on an image plane IP in the scanning-plane side. A second optical path indicated with a solid line is an optical path passing through the toroidal lenses L1 and L2 when the scanning mirror M1 or the scanning mirror M2 is placed on an object point.

In the case where image-side telecentricity is achieved, the second optical path is orthogonal to the image plane IP in the scanning-plane side. In other words, the imaging position of the second optical path is infinity.

In the scanning optical system with respect to the Y direction shown in FIG. 4A and in the scanning optical system with respect to the X direction shown in FIG. 4B, the scanning mirrors M1 and M2 are located at the focal positions of the object side related to the X direction and the Y direction. In this case, the imaging positions of the object-points which are located at the centers of the scanning mirrors are infinity. The focal position is apart from the principal point of the lens by a focal length of the lens.

In the scanning optical system of the present embodiment, the scanning mirror is placed on an entrance pupil and an exit pupil is located at infinity. In this case, the lens group, which includes the toroidal lenses L1 and L2, has image-side telecentricity.

The lens group, which includes the toroidal lenses L1 and L2, has image-side telecentricity in the cross sections of the lens group along the scanning directions, so that image-side telecentricity can be obtained in the cross sections along the scanning directions.

A simple method which achieves two-dimensional scanning is to scan in the X direction and the Y direction with a combination of two galvanometer mirrors. In this case, a space to allow the rotations of the mirrors has to be left between the two galvanometer mirrors.

If an ordinary axial rotation symmetry lens is used in the scanning optical system, the focal lengths of the lens in relation to all of the scanning directions are equal values and principal points of the lens in relation to all of the scanning directions are the same position. In this case, however, the two scanning mirrors cannot be placed at the same position. Thus, in the scanning optical system, the scanning mirrors are placed at different positions. In other words, in the scanning optical system, a distance from the center of rotation of the scanning mirror differs depending on the scanning direction. For this reason, in the case of the ordinary axial rotation symmetry lens, telecentricity can be unsatisfied depending on the scanning direction.

On the other hand, in the scanning optical system of the present embodiment, the special lens having different powers in the cross sections along the scanning directions is used, so that a telecentric condition is obtained regardless of the scanning direction.

Moreover, in order to increase the lens resolution, it is necessary to reduce the spot diameter of light entering the test surface from the scanning optical system, regardless of the scanning direction. For this purpose, the image surface of the scanning optical system has to be constant regardless of the scanning direction. Furthermore, the scanning optical system has to reduce an aberration to have a smaller spot diameter.

In particular, as a telecentric condition, an image plane coincidence condition that focal points of the lens group in relation to the scanning directions coincide on an image plane, and a beam spot condition which satisfies to lower aberration with a simple configuration, the following conditional expressions are shown:

Expression (1) is a conditional expression of a ratio of the focal length of the toroidal lens L1 in the case of the scanning in the X direction and the focal length of the toroidal lens L1 in the case of the scanning in the Y direction. The numerical range of Expression (1) is a numerical range for the toroidal lens L1 to satisfy necessary conditions in the scanning optical system of the present invention.

[Expression 1]

$$\left|\frac{f1x}{f1y}\right| < 1 \qquad (1)$$

Expression (2) is a conditional expression of a ratio of the focal length of the toroidal lens L2 in the case of the scanning in the X direction and the focal length of the toroidal lens L2 in the case of the scanning in the Y direction. The numerical range of Expression (2) is a numerical range for the toroidal lens L2 to satisfy necessary conditions in the scanning optical system of the present invention.

[Expression 2]

$$\left|\frac{f2x}{f2y}\right| > 1 \qquad (2)$$

In the present embodiment, the scanning in the Y direction is performed with the scanning mirror M2 near to the image surface and the scanning in the X direction is performed with the scanning mirror M1 far from the image surface. In the present embodiment, the condition (numerical range) of Expression (1) is the condition of the toroidal lens L1 and the condition (numerical range) of Expression (2) is the condition of the toroidal lens L2. These expressions with respect to the lenses may be switched by changing conditions such as the scanning direction.

In order to obtain a satisfactory spot of light passing through two lenses, a lens having a positive power (hereinafter, a positive lens) and a lens having a negative power (hereinafter, a negative lens) are desirably combined. This is because the aberration of the positive lens (mainly a spherical aberration) is canceled on the negative lens.

Since a lens having a high-power surface tends to have a high-order aberration (mainly a spherical aberration), the lens group of the present embodiment is comprised of two lenses having a positive power and a negative power as a telephoto-type configuration (sequentially arranging the positive lens and the negative lens from the light source). The lens group is comprised as the telephoto-type configuration because the telephoto-type configuration can achieve a long focal length without increasing the power of a surface.

Instead of the telephoto-type configuration, the lens group may be comprised as a retrofocus-type configuration (sequentially arranging the negative lens and the positive lens from the light source). By comprising the lens group as the retrofocus-type configuration, one of the focal lengths in relation to the X direction and the Y direction can be shortened without increasing the power of a surface. The telephoto-type configuration or the retrofocus-type configuration is selected depending on the focal length. In particular, in the case where a distance from the exit surface of the image-side lens to an image plane (hereinafter, will be referred to as a working distance) is relatively longer than the focal length, it is valid to comprise the lens group as the retrofocus-type configuration.

In the case where the lens group, which includes the two lenses, has different focal lengths in relation to the cross sections along the scanning directions, as the present embodiment, it is desirable that the cross section when the focal length is long has a configuration like the telephoto-type configuration and the cross section when the focal length is short has a configuration like the retrofocus-type configuration.

In the cross section of the lens group along the Y direction when the focal length is short, the toroidal lens L2 has a strong positive power and the toroidal lens L1 substantially has a negative power. This relationship is desirably reversed in the cross section of the lens group along the X direction. Thus, on the toroidal lens L1, the focal length in the case of the scanning in the Y direction is desirably longer than the focal length in the case of the scanning in the X direction. On the toroidal lens L2, the focal length in the case of the scanning in the X direction is desirably longer than the focal length in the case of the scanning in the Y direction.

Expression (3) is a conditional expression of a ratio of a difference in the focal lengths of the lens group, which includes the toroidal lenses L1 and L2, with respect to the cross sections along the respective scanning directions and a distance between the scanning mirrors. In this case, the numerical range of Expression (3) is a desirable numerical range in the present embodiment.

[Expression 3]

$$0.2 < \frac{|fx - fy|}{Dm} < 1.4 \quad (3)$$

The reason why the numerical range of Expression (3) is set will be described below.

As has been described above, in the present embodiment, the two toroidal lenses are used to achieve the telecentric optical system. The focal length inevitably differs in relation to the cross sections of the lens group along the scanning directions. With respect to the cross sections, which have different focal lengths in relation to the scanning directions, it is necessary to displace the image-side principal point of the lens group by the difference in the focal lengths so that the image surfaces in the cross sections correspond.

Expression (3) specifies the amount of displacement. If the value of the displacement becomes larger, the difference in the focal lengths becomes larger relative to the interval of the toroidal lenses L1 and L2 and is remarkable. In other words, the cross sections of the toroidal lenses L1 and L2 in the present embodiment along the scanning directions are considerably different in shape depending on the scanning directions.

In particular, when viewed from the light source 111, in the cross section along the Y direction when a focal length is short, the toroidal lenses are arranged in order of the negative power and the positive power as retrofocus-type configuration. In the cross section along the X direction when a focal length is long, the toroidal lenses are arranged in order of the positive power and the negative power as telephoto-type configuration. This means that positive and negative powers of the toroidal lenses are reversed depending on the cross section along the scanning direction. For this reason, the toroidal lenses of the present embodiment tend to have distorted shapes and are difficult to machine. Furthermore, since the toroidal lenses have distorted shapes, disadvantages that thicknesses and aberrations of surfaces are large are suffered.

In the case where the resultant value of Expression (3) is small (the difference in the focal lengths is smaller than the distance between the toroidal lenses L1 and L2), it is difficult to achieve the image plane coincidence condition and the telecentric condition. This is because the difference in the focal lengths, as has been described above, results from the distance between the scanning mirrors.

Moreover, the numerical range of Expression (3) is a condition for regular shapes of the toroidal lenses and satisfies the image plane coincidence condition and the telecentric condition.

Expression (4) is a conditional expression of a ratio of a distance from the toroidal lens L2 to the test surface and the focal length of the lens group, which includes the toroidal lenses L1 and L2, in the case of the scanning in the Y direction.

[Expression 4]

$$0.6 < \frac{WD}{fy} < 1.4 \quad (4)$$

The reason why the numerical range of Expression (4) is set will be described below.

In the present embodiment, the focal length of the lens group, which includes the toroidal lenses L1 and L2, in the case of the scanning in the Y direction is shorter than the focal length of the lens group in the case of the scanning in the X direction. Thus, the retrofocus-type configuration, which includes lenses arranged in order of the negative and positive powers, is desirable as the lens group of the present embodiment. Expression (4) corresponds to the retro ratio of the retrofocus-type configuration. Expression (4) indicates the ratio of the length of a back focus (rear focus) to the focal length of the lens group in the case of the scanning in the Y direction. When the cross section of the lens group along the X direction is the telephoto-type configuration, which includes lenses arranged in order of the positive and negative powers, the lenses are formed in an irregular shape with considerably different curvatures in different scanning directions. Thus, it is difficult to make toroidal lenses for achieving this case, and the aberration of the toroidal lens may further deteriorate.

At an angle of view around the center of the optical axis of the retrofocus-type configuration, the aberration canceled on the positive lens decreases while the aberration canceled on the negative lens increases. If the resultant value of WD/fy in Expression (4) becomes larger, the retro ratio becomes larger. In other words, the ratio of the aberration canceled on the negative lens (toroidal lens L1) increases. Therefore, it is difficult to achieve the lens group less affected by aberration with toroidal lens L1 having a simple configuration.

Conversely, the resultant value of WD/fy in Expression (4) becomes smaller, the retro ratio becomes smaller. In other words, the ratio of an aberration canceled on the positive lens (toroidal lens L2) increases, and the toroidal lens L2 has a complicated configuration.

The numerical range of Expression (4) is a numerical range for satisfying these conditions.

Expression (5) is a conditional expression of a ratio of the sum of the distance between the toroidal lenses L1 and L2 and the distance from the toroidal lens L2 to the test surface and the focal length of the lens group, which includes the toroidal lenses L1 and L2, in the case of the scanning in the X direction.

[Expression 5]

$$0.6 < \frac{D + WD}{fx} < 1.4 \quad (5)$$

Expression (5) corresponds to an expression of a ratio of the length of the optical system and the focal length of the lens group, which includes the toroidal lenses L1 and L2, in the case of the scanning in the X direction.

The reason why the numerical range of Expression (5) is set will be described below.

As has been described above, the telephoto-type configuration, on which a focal length in the case of the scanning in the X direction is long, is selected as the lens group in the present embodiment. Expression (5) corresponds to the telephoto ratio of the telephoto-type configuration. As the resultant value of Expression (5) becomes smaller, the lens group including the toroidal lenses L1 and L2 acts as a lens group on which a focal length is long relative to the length of the optical system. In the telephoto-type configuration, if the telephoto ratio becomes smaller and the focal length becomes shorter, powers of the positive and negative lenses become larger and aberration deteriorates. If the resultant value of Expression (5) is smaller than the numerical range of Expression (5), the powers of the toroidal lenses L1 and L2 tend to become larger. Hence, it is difficult to keep a satisfactory aberration in a simple configuration.

In the case where the resultant value of Expression (5), which corresponds to the telephoto ratio, is beyond the numerical range of Expression (5), the lens group cannot keep a compact configuration.

The numerical range of Expression (5) is a numerical range satisfying conditions for solving these problems.

Furthermore, in the lens group of the present embodiment, it is desirable to satisfy the numerical range of Expression (6).

[Expression 6]

$$0.5 < \frac{f1x}{fx} < 1.4 \quad (6)$$

The reason why the numerical range of Expression (6) is desirable will be described below.

Expression (6) is a conditional expression of a ratio of the focal length of the toroidal lens L1 in the case of the scanning in the X direction and the focal length of the lens group, which includes the toroidal lenses L1 and L2, in the case of the scanning in the X direction. The conditional expression specifies the reciprocal of the magnification of the second lens (toroidal lens L2) in the optical system including the two lenses.

In the optical system, the aberration of the first lens (toroidal lens L1) is increased by a magnification of the subsequent lens of the first lens (toroidal lens L1). In particular, like the telephoto-type configuration of the present embodiment, on a lens group on which a focal length in the case of the scanning in the X direction is long, a magnification tends to become larger, and an aberration to be canceled on the second lens (toroidal lens L2) becomes larger.

When a resultant value of Expression (6) becomes smaller than the numerical range of Expression (6), the magnification of the toroidal lens L2 becomes larger. Thus, the aberration of the toroidal lens L1 is considerably increased on the toroidal lens L2.

When a resultant value of Expression (6) becomes larger than the numerical range of Expression (6), the magnification of the toroidal lens L2 becomes smaller. In this case, the aberration of the toroidal lens L1 is not considerably increased. However, if the magnification becomes smaller, it is necessary to make the optical system larger. Thus, it is difficult to obtain a compact optical system.

The numerical range of Expression (6) is a numerical range satisfying conditions for solving these problems.

Moreover, in the lens group of the present embodiment, it is desirable to satisfy the numerical range of Expression (7).

[Expression 7]

$$1.0 < \frac{fx}{fy} < 1.7 \quad (7)$$

Expression (7) is a conditional expression of a ratio of the focal length of the lens group, which includes the toroidal lenses L1 and L2, in the case of the scanning in the X direction and the focal length of the lens group in the case of the scanning in the Y direction.

The reason why the numerical range of Expression (7) is desirable will be described below.

In order to satisfy the telecentric condition, the lens group of the present embodiment is designed so that the focal lengths in relation to the scanning directions will be different by the distance between the mirrors.

In the case where a ratio of powers in the cross sections of the lens group along the scanning directions is beyond the numerical range of Expression (7), a spot becomes oval in an intermediate direction of the X direction and the Y direction, that is, in a diagonal direction. In this case, unlike in the present embodiment, it is difficult to reduce a spot diameter with a simple configuration including two toroidal lenses.

The numerical range of Expression (7) is a numerical range satisfying conditions for solving these problems.

Furthermore, in the lens group of the present embodiment, it is desirable to satisfy the numerical range of Expression (8).

[Expression 8]

$$\left| \left( \frac{1}{f1x} + \frac{1}{f2x} \right) - \left( \frac{1}{f1y} + \frac{1}{f2y} \right) \right| < 0.02 \quad (8)$$

The reason why the numerical range of Expression (8) is desirable will be described below.

Expression (8) is a conditional expression of the reciprocals of the focal lengths of the toroidal lenses L1 and L2 in the cases of the scanning in the X direction and the scanning in the Y direction. In other words, Expression (8) is a conditional expression of the sum of the power differences of the two toroidal lenses.

In the optical system, the sum of the powers of the lenses is a value affecting astigmatism. As the sum of powers is close to zero, the astigmatism decreases, a nearly circular beam spot is formed at a point far from the center, and excellent optical performance is achieved. In order to satisfy the telecentric condition according to the present embodiment, however, the powers differ depending on the scanning direction. Hence, a difference is likely to occur in the resultant value of Expression (8).

Thus, the astigmatism can be reduced and a nearly circular beam spot can be formed by satisfying the numerical range of Expression (8). Consequently, by satisfying the condition of Expression (8), the scanning optical system with a high resolution can be configured regardless of the scanning direction.

Beyond the upper bound of Expression (8), the astigmatism increases and a beam spot become distorted at a point far from the center. In this case, a difference in resolution occurs depending on the scanning direction.

Moreover, the use of aspherical lenses can further reduce the size of a spot to a near-perfect circular shape, further the resolutions of the lenses increase.

As has been described above, in the present embodiment, the lens group including the two toroidal lenses is placed between the scanning mirror and the test surface. With this configuration, a compact telecentric scanning optical system with a simple configuration can be achieved.

EXAMPLE

Referring to FIGS. 1A, 1B, and so on, an example of the first embodiment will be described below. On the lens 131, the focal length f1x when the scanning direction is the X direction is 53.45 mm and the focal length f1y when the scanning direction is the Y direction is 86.55 mm. On the lens 132, the focal length f2x when the scanning direction is the X direction is −380.1 mm and the focal length f2y when the scanning direction is the Y direction is 159.54 mm.

On the optical system (the lens group) including the lenses 131 and 132, the focal length fx when the scanning direction is the X direction is 68.27 mm and the focal length fy when the scanning direction is the Y direction is 60 mm.

A distance between the center of the mirror 121 and the center of the mirror 122 is 10 mm.

The two-dimensional scanning device 100, which includes the optical system configured thus, is used to rotate the mirror 121 by ±4.83° around the rotation axis 123 and rotate the mirror 122 by ±5.34° around the rotation axis 124, so that a square range of 20 mm by 20 mm is scanned on the test surface 101.

FIG. 5 shows the specifications of optical elements constituting the two-dimensional scanning device 100.

In a table of specifications shown in FIG. 5, with respect to the surfaces of the optical elements in the optical system, the surface number, the effective diameter, RX (a radius of curvature in the X direction), RY (a radius of curvature in the Y direction), the distance (a distance to the optical system of the subsequent number), and the refractive index are listed.

FIG. 6 shows the resultant values of Expressions (1) to (8) on the basis of calculations using the data of the table of specifications. In the table shown in FIG. 6, with respect to Expressions (1) to (8), the expression number and calculation result of the expression are listed.

In FIG. 5, surface number 1 is a surface number assigned to the reflecting surface of the mirror 121. Surface number 2 is a surface number assigned to the reflecting surface of the mirror 122. Surface number 3 is a surface number assigned to the entrance surface of the lens 131. Surface number 4 is a surface number assigned to the exit surface of the lens 131. Surface number 5 is a surface number assigned to the entrance surface of the lens 132. Surface number 6 is a surface number assigned to the exit surface of the lens 132.

As shown in FIG. 5, in the configuration of the present embodiment, a mirror distance Dm which affects the difference in the focal lengths fx and fy is 10 mm. Moreover, a working distance WD which affects a retro ratio and a telephoto ratio is 45 mm. In the two-dimensional scanning device 100, owing to the values shown in FIG. 6, the telecentric condition, the image plane coincidence condition, and the beam spot condition are satisfied regardless of the scanning direction.

Figure 7A:
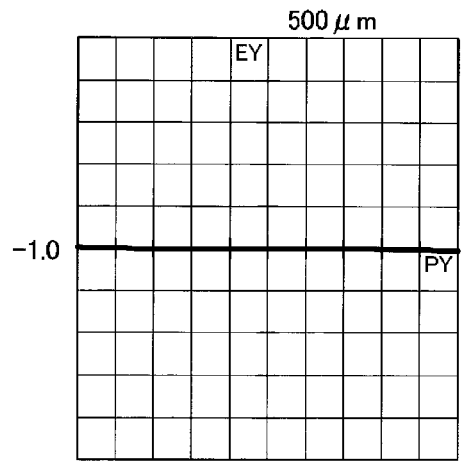
FIG. 7A is a lateral aberration diagram at coordinate [0,0] on the test surface scanned in the Y direction by the two-dimensional scanning device according to the first embodiment.
Figure 7B:
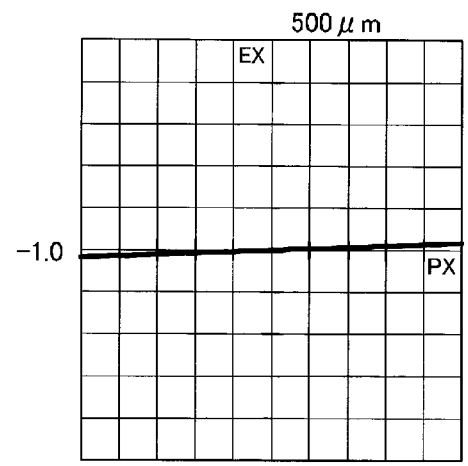
FIG. 7B is a lateral aberration diagram at coordinate [0,0] on the test surface scanned in the X direction by the two-dimensional scanning device according to the first embodiment.
Figure 8A:
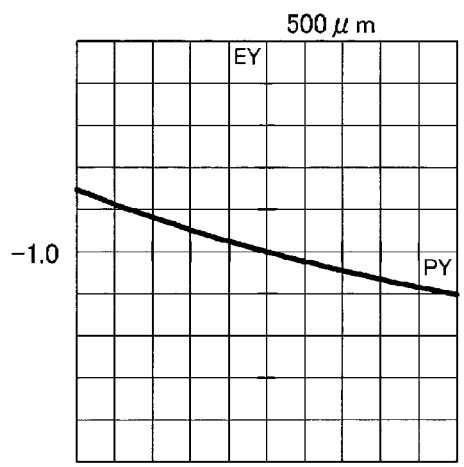
FIG. 8A is a lateral aberration diagram at coordinate [−10,−10] on the test surface scanned in the Y direction by the two-dimensional scanning device according to the first embodiment.
Figure 8B:
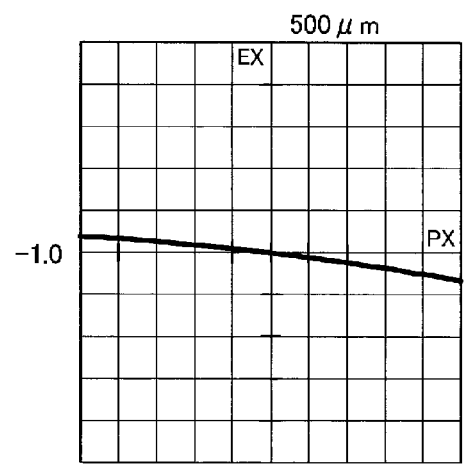
FIG. 8B is a lateral aberration diagram at coordinate [−10,−10] on the test surface scanned in the X direction by the two-dimensional scanning device according to the first embodiment.

FIG. 7A shows a lateral aberration at coordinate [0,0] on the test surface 101 scanned in the Y direction on the two-dimensional scanning device 100. FIG. 7B shows a lateral aberration at coordinate [0,0] on the test surface 101 scanned in the X direction on the two-dimensional scanning device 100. FIG. 8A shows a lateral aberration at coordinate [−10,−10] on the test surface 101 scanned in the Y direction on the two-dimensional scanning device 100. FIG. 8B shows a lateral aberration at coordinate [−10,−10] on the test surface 101 scanned in the X direction on the two-dimensional scanning device 100. In these drawings, lateral aberrations are plotted in coordinates with grid lines drawn at intervals of 100 µm. As illustrated in the graphs of these drawings, the two-dimensional scanning device 100 has a sufficiently low aberration that does not adversely affect two-dimensional scanning.

The distance of surface number 1 is a distance from the center of the mirror 121 to the center of the mirror 122. The distance of surface number 2 is a distance from the mirror 122 to the entrance surface of the lens 131 on the optical axis. The distance of surface number 3 is a distance from the entrance surface of the lens 131 to the exit surface of the lens 131 on the optical axis. The distance of surface number 4 is a distance from the exit surface of the lens 131 to the entrance surface of the lens 132 on the optical axis. The distance of surface number 5 is a distance from the entrance surface of the lens 132 to the exit surface of the lens 132 on the optical axis. The distance of surface number 6 is a distance from the exit surface of the lens 132 to the test surface 101 on the optical axis.

The refractive index of each surface number is a refractive index in the case of light having a wavelength of 1310 nm.

In the present embodiment, the mirrors 121 and 122, which are two galvanometer mirrors, are used to two-dimensionally move light on a surface. If a similar result is provided, instead of the two galvanometer mirrors, a single mirror which can oscillate in two axes or a light source which can swingingly irradiates the test surface with light may be used.

Summary

In the present embodiment, the lenses 131 and 132 are toroidal lenses, and the mirrors 121 and 122 and the lenses 131 and 132 are sequentially arranged from the light source 111. At this point, the mirrors 121 and 122 are placed so as to two-dimensionally scan a surface. The lenses 131 and 132 are adjacent to each other. This configuration can achieve a compact two-dimensional scanning device that suppresses scanning distortion and has a simple configuration.

(Second Embodiment)

A second embodiment of the present invention will be described below in accordance with the accompanying drawings.

Figure 9:
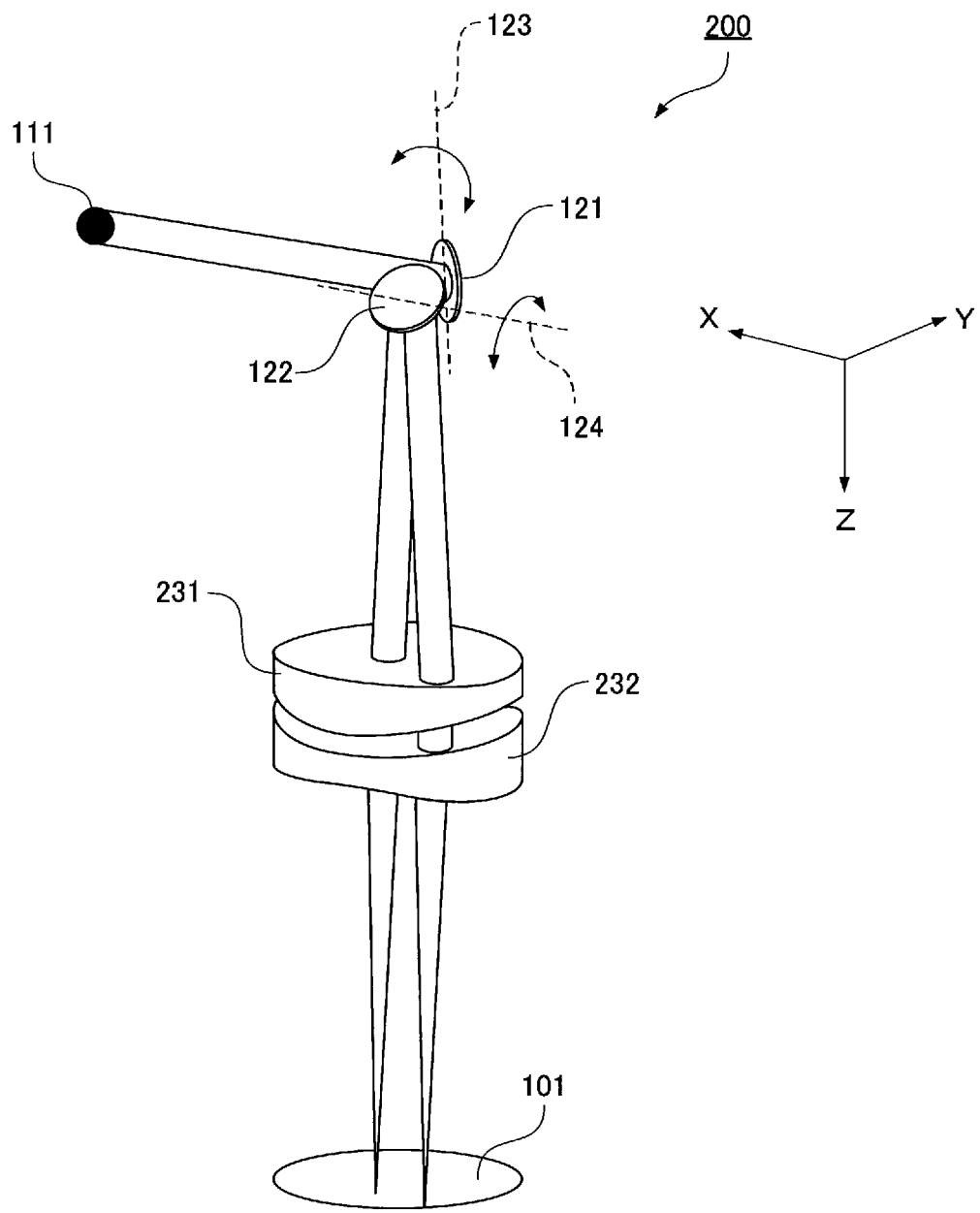
FIG. 9 is a bird's eye view showing a two-dimensional scanning device according to a second embodiment of the present invention.
Figure 10:
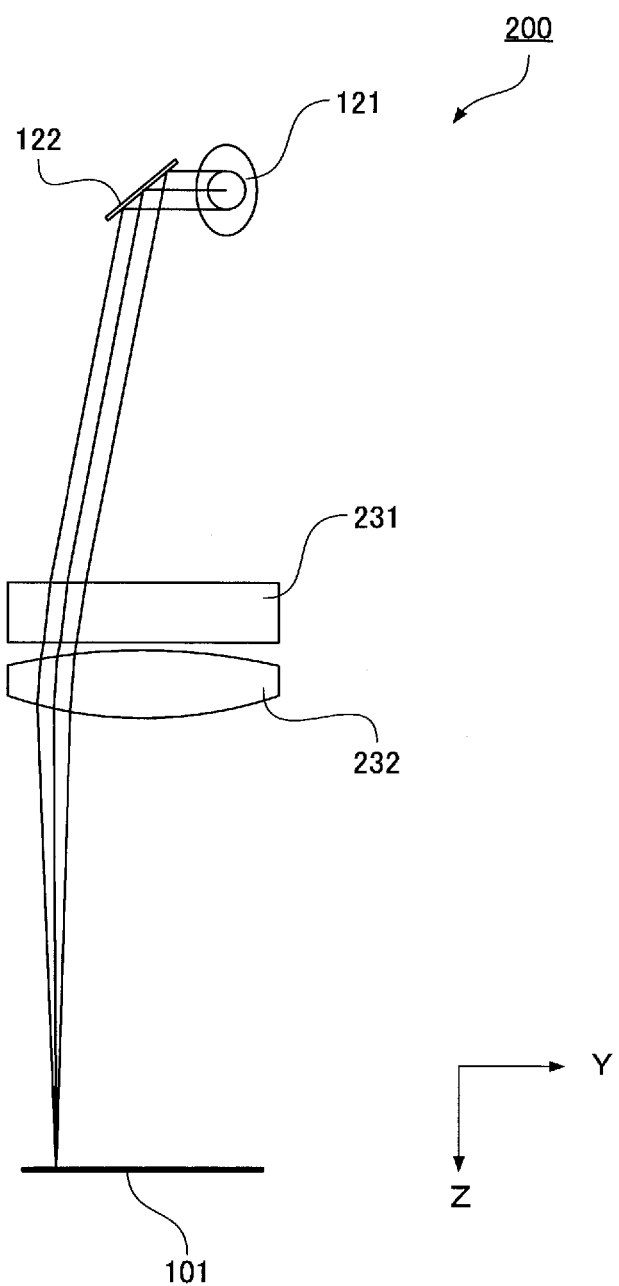
FIG. 10 shows the two-dimensional scanning device viewed in the X direction according to the second embodiment.
Figure 11:
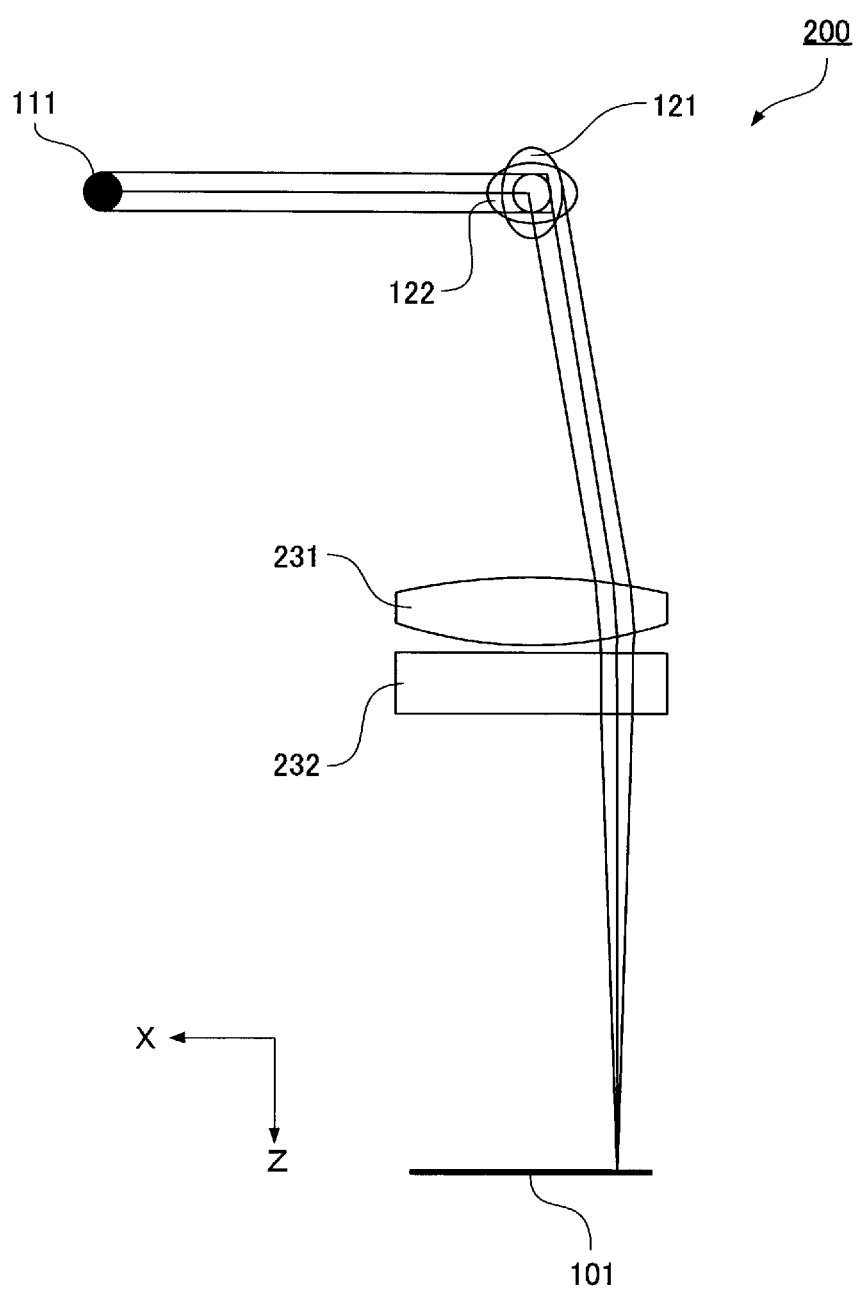
FIG. 11 shows the two-dimensional scanning device viewed in the Y direction according to the second embodiment.

As shown in FIG. 9, a two-dimensional scanning device 200 of the present embodiment is different from the two-dimensional scanning device 100 of the first embodiment in that lenses 231 and 232 are provided instead of the lenses 131 and 132.

<Lenses 231 and 232>

The lens 231 is a cylindrical lens having the power only in the cross section along the X direction. The lens 232 is a cylindrical lens having the power only in the cross section along the Y direction.

The cylindrical lens is one form of a toroidal lens. Hence, the design conditions of the optical elements described in the first embodiment are also applicable to the second embodiment.

The orientation of the lens 231 is adjusted such that the optical axis of the lens 231 is parallel to the Z axis. The orientation of the lens 232 is adjusted such that the optical axis of the lens 232 is parallel to the Z axis. The optical axes of the lenses 231 and 232 are the same axis.

The lens 231 is placed near the mirror 122. The lens 232 is placed near the test surface 101. The light reflected off the mirror 122 enters the lens 231. The light exiting from the lens 231 enters the lens 232.

The lens 231 is rectangular in YZ-section. The lens 232 is rectangular in XZ-section. The lens 231 is convex (positive)

on a plane perpendicular to the Y axis and is flat on a plane perpendicular to the X axis. With respect to the lens 231, the curvature of the exit surface is larger than the curvature of the entrance surface.

The lens 232 is flat on a plane perpendicular to the Y axis and is convex (positive) on a plane perpendicular to the X axis. With respect to the lens 232, the curvature of the exit surface is larger than the curvature of the entrance surface.

A cylindrical lens can be more easily made than a toroidal lens. However, a retrofocus-type optical system and a telephoto-type optical system cannot be composed of cylindrical lenses. In order to satisfy the telecentric condition, the image plane coincidence condition, and the beam spot condition with cylindrical lenses, cylindrical lenses have to have aspheric surfaces.

EXAMPLE

Referring to FIGS. 9 and so on, an example of the second embodiment will be described below. On the lens 231, the focal length f1x when the scanning direction is the X direction is 60.02 mm and the focal length f1y when the scanning direction is the Y direction is infinite. On the lens 232, the focal length f2x when the scanning direction is the X direction is infinite and the focal length f2y when the scanning direction is the Y direction is 54.44 mm.

On the optical system (a lens group) including the lenses 231 and 232, the focal length fx when the scanning direction is the X direction is 60.02 mm and the focal length fy when the scanning direction is the Y direction is 54.44 mm.

A distance between the center of the mirror 121 and the center of the mirror 122 is 10 mm. A distance between the exit surface of the lens 231 and the exit surface of the lens 232 is 5.58 mm.

The two-dimensional scanning device 200, which includes the optical system configured thus, is used to rotate the mirror 121 by ±4.83° around the rotation axis 123 and rotate the mirror 122 by ±5.34° around the rotation axis 124, so that a square range of 20 mm by 20 mm is scanned on the test surface 101.

FIG. 12 shows the specifications of optical elements constituting the two-dimensional scanning device 200. FIG. 13 shows the resultant values of Expressions (1) to (8) on the basis of calculations using the data of the table of specifications. In the two-dimensional scanning device 200, owing to the values shown in FIG. 13, the telecentric condition, the image plane coincidence condition, and the beam spot condition are satisfied regardless of the scanning direction.

Since the reflecting surface of the mirror 121 is a flat surface, RX and RY of surface number 1 are inf (infinite). Since the reflecting surface of the mirror 122 is a flat surface, RX and RY of surface number 2 are inf (infinite). Since the YZ-section of the lens 231 is rectangular, RY of surface numbers 3 and 4 is inf (infinite). Since the XZ-section of the lens 232 is rectangular, RX of surface numbers 5 and 6 is inf (infinite).

The exit surface of the lens 231 is an aspheric surface. The exit surface of the lens 232 is an aspheric surface. In other words, with respect to the lenses 231 and 232, of the entrance surface and the exit surface, a surface having a large curvature is an aspheric surface. The shape of the aspheric surface is defined by Expression (9) below.

In Expression (9), X is a value in the optical axis direction, H is a value in a direction perpendicular to the optical axis direction, a sign in the traveling direction of light is positive, R is a paraxial radius of curvature, k is an eccentricity, and A, B, C, and D are aspherical coefficients.

[Expression 9]

$$X = -\frac{1}{R}\frac{H^2}{\left\{1 + (1-(1+k)\left(\frac{H}{R}\right)^2\right\}^{\frac{1}{2}}} + AH^4 + BH^6 + CH^8 + DH^{10} \quad (9)$$

A mirror distance Dm is 10 mm. A working distance WD is 52.36 mm. The values of FIG. 13 have proved that In the two-dimensional scanning device 200, owing to the values shown in FIG. 13, the telecentric condition, the image plane coincidence condition, and the beam spot condition are satisfied regardless of the scanning direction.

Figure 14A:
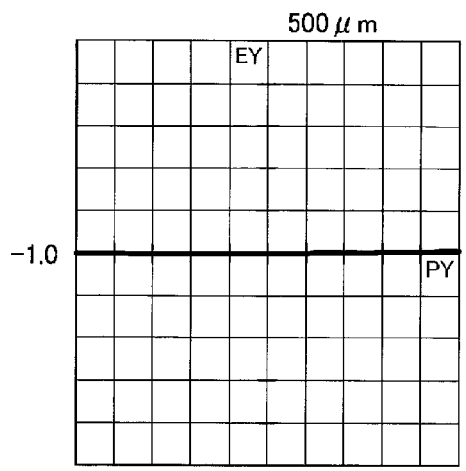
FIG. 14A is a lateral aberration diagram at coordinate [0,0] on the test surface scanned in the Y direction by the two-dimensional scanning device according to the second embodiment.
Figure 14B:
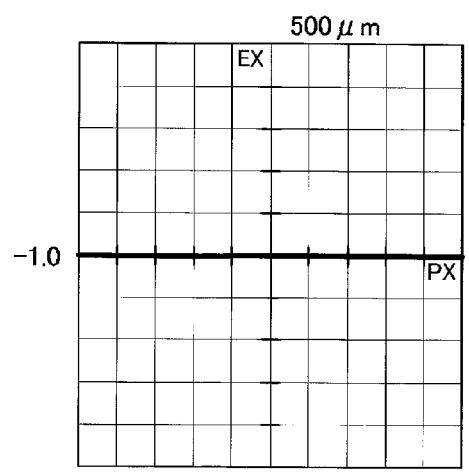
FIG. 14B is a lateral aberration diagram at coordinate [0,0] on the test surface scanned in the X direction by the two-dimensional scanning device according to the second embodiment.
Figure 15A:
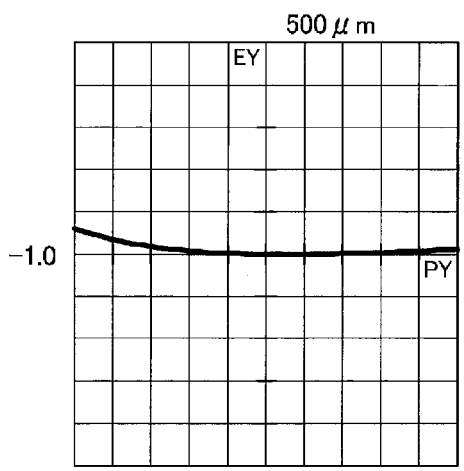
FIG. 15A is a lateral aberration diagram at coordinate [−10,−10] on the test surface scanned in the Y direction by the two-dimensional scanning device according to the second embodiment.
Figure 15B:
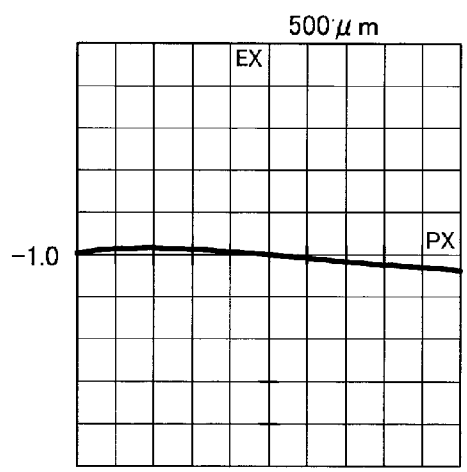
FIG. 15B is a lateral aberration diagram at coordinate [−10,−10] on the test surface scanned in the X direction by the two-dimensional scanning device according to the second embodiment.

FIG. 14A shows a lateral aberration at coordinate [0,0] on the test surface 101 scanned in the Y direction on the two-dimensional scanning device 200. FIG. 14B shows a lateral aberration at coordinate [0,0] on the test surface 101 scanned in the X direction on the two-dimensional scanning device 200. FIG. 15A shows a lateral aberration at coordinate [−10,−10] on the test surface 101 scanned in the Y direction on the two-dimensional scanning device 200. FIG. 15B shows a lateral aberration at coordinate [−10,−10] on the test surface 101 scanned in the X direction on the two-dimensional scanning device 200. In these drawings, lateral aberrations are plotted in coordinates with grid lines drawn at intervals of 100 μm. As illustrated in the graphs of these drawings, the two-dimensional scanning device 200 has a sufficiently low aberration that does not adversely affect two-dimensional scanning.

Summary

In the present embodiment, the lenses 231 and 232 are cylindrical lenses. Thus, a compact two-dimensional scanning device which obtains a two-dimensional image with little distortion and a high-precision resolution by two-dimensional scanning and has a simple configuration can be achieved. The two-dimensional scanning device 200 of the second embodiment has higher flexibility in lens shape than the two-dimensional scanning device 100 of the first embodiment.

(Third Embodiment)

A third embodiment of the present invention will be described below in accordance with the accompanying drawings.

Figure 16:
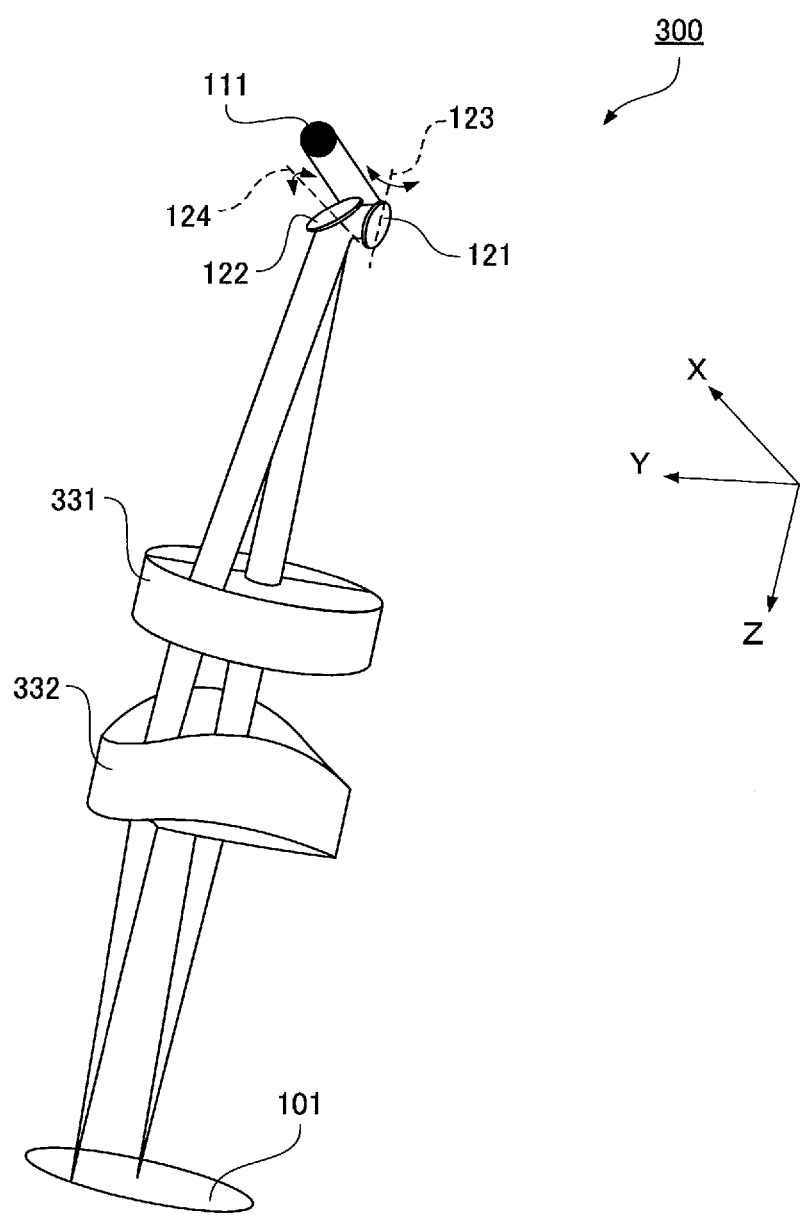
FIG. 16 is a bird's eye view showing a two-dimensional scanning device according to a third embodiment of the present invention.

As shown in FIG. 16, a two-dimensional scanning device 300 of the present embodiment is different from the two-dimensional scanning device 100 of the first embodiment in that lenses 331 and 332 are provided instead of the lenses 131 and 132.

<Lenses 331 and 332>

The lens 331 is a toroidal lens having different powers in relation to the X direction and the Y direction. The lens 332 is a toroidal lens having different powers in relation to the X direction and the Y direction. The orientation of the lens 331 is adjusted such that the optical axis of the lens 331 is parallel to the Z axis. The orientation of the lens 332 is adjusted such that the optical axis of the lens 332 is parallel to the Z axis. The optical axes of the lenses 331 and 332 are the same axis.

The lens 331 is placed near the mirror 122. The lens 332 is placed near the test surface 101. The light reflected off the mirror 122 enters the lens 331. The light exiting from the lens 331 enters the lens 332.

Figure 17:
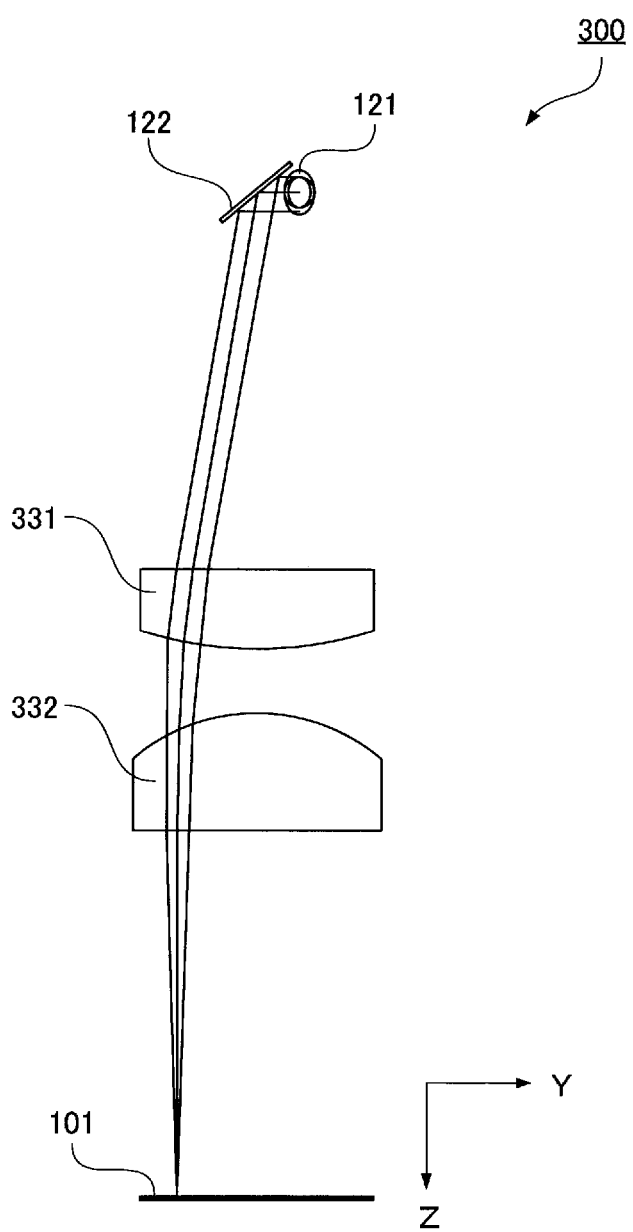
FIG. 17 shows the two-dimensional scanning device viewed in the X direction according to the third embodiment.
Figure 18:
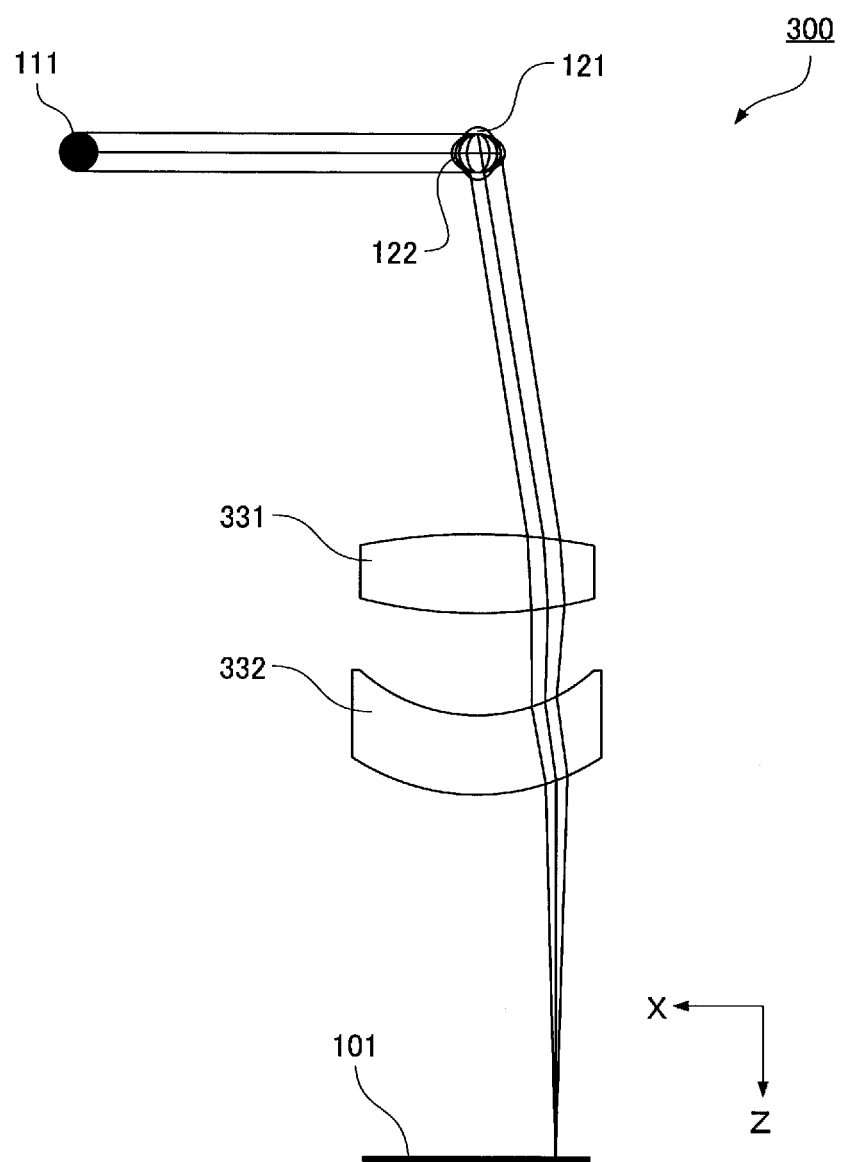
FIG. 18 shows the two-dimensional scanning device viewed in the Y direction according to the third embodiment.

As shown in FIGS. 17 and 18, the entrance surface of the lens 331 is curved convexly (positive) in the X direction and is curved convexly (positive) in the Y direction. With respect to the entrance surface of the lens 331, the curvature in the X direction is larger than the curvature in the Y direction. The exit surface of the lens 331 is curved concavely (negative) in the X direction and is curved concavely (negative) in the Y direction. With respect to the exit surface of the lens 331, the curvature in the X direction and the Y direction are much the same. The entrance surface of the lens 332 is curved concavely (negative) in the X direction and is curved convexly (positive) in the Y direction. With respect to the entrance surface of the lens 332, the curvature in the X direction is larger than the curvature in the Y direction. The exit surface of the lens 332 is curved concavely (negative) in the X direction and is curved concavely (negative) in the Y direction. With respect to the exit surface of the lens 332, the curvature in the X direction is larger than the curvature in the Y direction.

EXAMPLE

Referring to FIG. 16 and so on, an example of the third embodiment will be described below. On the lens 331, the focal length f1x when the scanning direction is the X direction is 51.82 mm and the focal length f1y when the scanning direction is the Y direction is 83.98 mm. On the lens 332, the focal length f2x when the scanning direction is the X direction is −413.17 mm and the focal length f2y when the scanning direction is the Y direction is 172.9 mm.

On the optical system including the lenses 331 and 332, the focal length fx when the scanning direction is the X direction is 66.16 mm and the focal length fy when the scanning direction is the Y direction is 60 mm.

A distance between the center of the mirror 121 and the center of the mirror 122 is 10 mm.

The two-dimensional scanning device 300, which includes the optical system configured thus, is used to rotate the mirror 121 by ±4.5° around the rotation axis 123 and rotate the mirror 122 by ±5.0° around the rotation axis 124, so that a square range of 20 mm by 20 mm is scanned on the test surface 101.

FIG. 19 shows the specifications of optical elements constituting the two-dimensional scanning device 300. FIG. 20 shows the resultant values of Expressions (1) to (8) on the basis of calculations using the data of the table of specifications.

A mirror distance Dm is 5 mm. A working distance WD is 45 mm. The values of FIG. 20 have proved that In the two-dimensional scanning device 300, owing to the values shown in FIG. 20, the telecentric condition, the image plane coincidence condition, and the beam spot condition are satisfied regardless of the scanning direction.

Figure 21A:
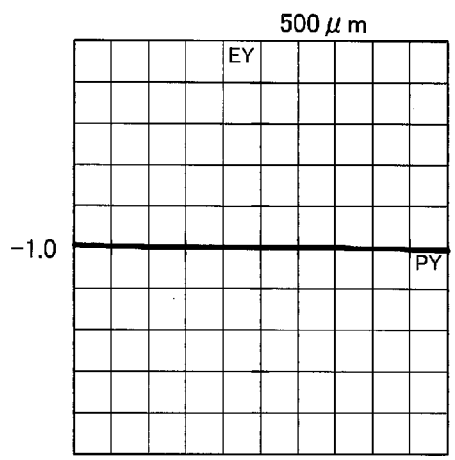
FIG. 21A is a lateral aberration diagram at coordinate [0,0] on the test surface scanned in the Y direction by the two-dimensional scanning device according to the third embodiment.
Figure 21B:
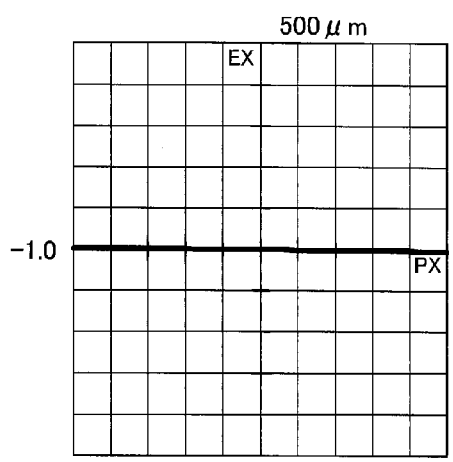
FIG. 21B is a lateral aberration diagram at coordinate [0,0] on the test surface scanned in the X direction by the two-dimensional scanning device according to the third embodiment.
Figure 22A:
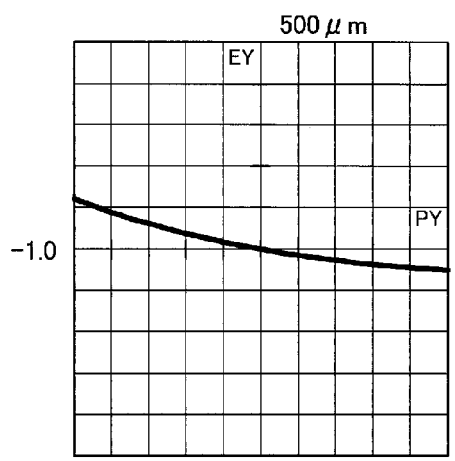
FIG. 22A is a lateral aberration diagram at coordinate [−10,−10] on the test surface scanned in the Y direction by the two-dimensional scanning device according to the third embodiment.
Figure 22B:
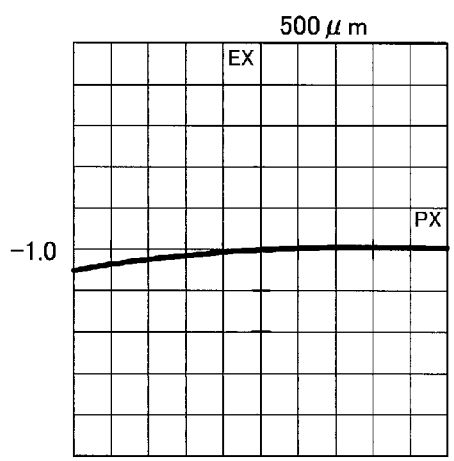
FIG. 22B is a lateral aberration diagram at coordinate [−10,−10] on the test surface scanned in the X direction by the two-dimensional scanning device according to the third embodiment.

FIG. 21A shows a lateral aberration at coordinate [0,0] on the test surface 101 scanned in the Y direction on the two-dimensional scanning device 300. FIG. 21B shows a lateral aberration at coordinate [0,0] on the test surface 101 scanned in the X direction on the two-dimensional scanning device 300. FIG. 22A shows a lateral aberration at coordinate [−10,−10] on the test surface 101 scanned in the Y direction on the two-dimensional scanning device 300. FIG. 22B shows a lateral aberration at coordinate [−10,−10] on the test surface 101 scanned in the X direction on the two-dimensional scanning device 300. In these drawings, lateral aberrations are plotted in coordinates with grid lines drawn at intervals of 100 gm. As illustrated in the graphs of these drawings, the two-dimensional scanning device 300 has a sufficiently low aberration that does not adversely affect two-dimensional scanning.

Summary

In the third embodiment, the lenses 331 and 332 are toroidal lenses having special shapes. Thus, a compact two-dimensional scanning device which obtains a two-dimensional image with little distortion and a high-precision resolution by two-dimensional scanning and has a simple configuration can be achieved.

(Fourth Embodiment)

A fourth embodiment of the present invention will be described below in accordance with the accompanying drawings.

Figure 23:
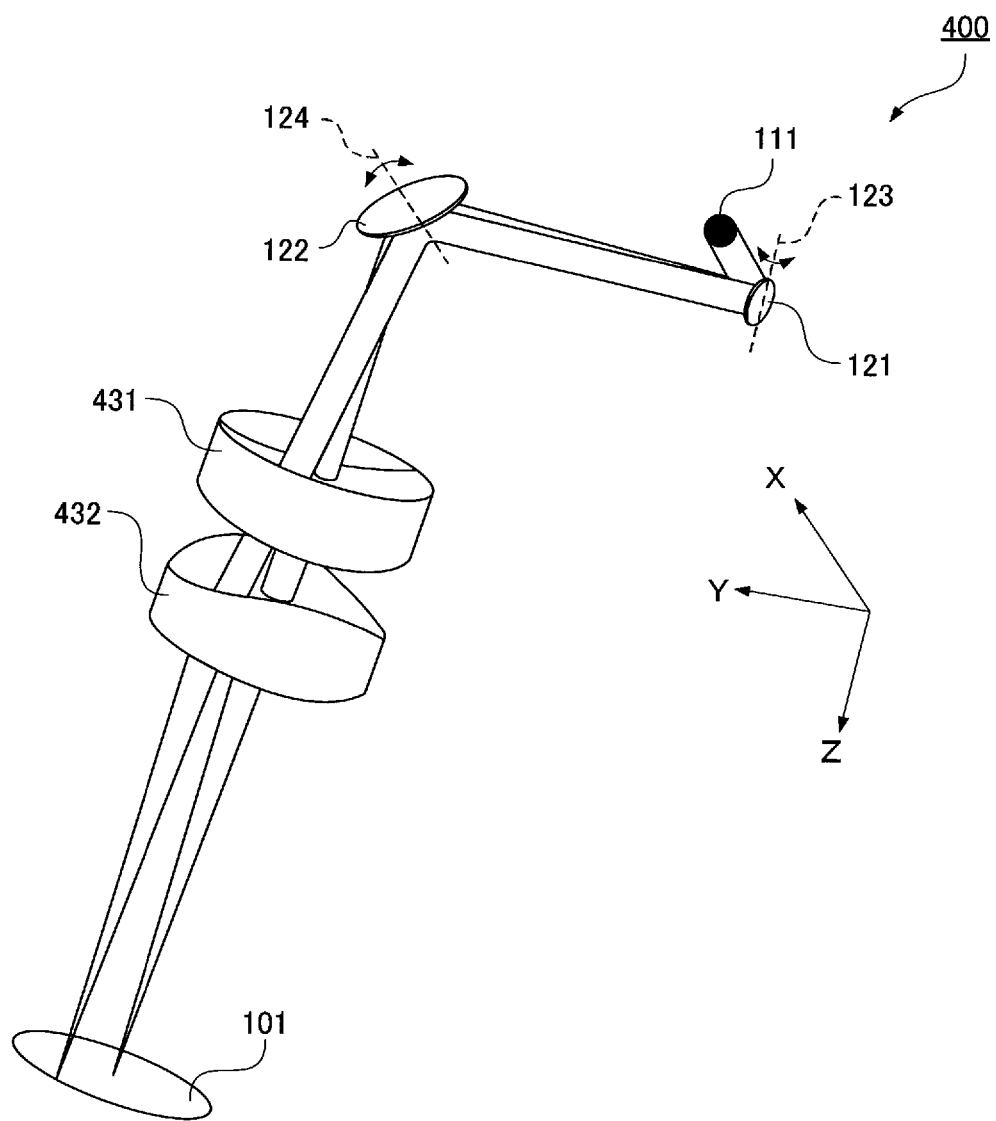
FIG. 23 is a bird's eye view showing a two-dimensional scanning device according to a fourth embodiment of the present invention.

As shown in FIG. 23, a two-dimensional scanning device 400 of the present embodiment is different from the two-dimensional scanning device 100 of the first embodiment in that lenses 431 and 432 are provided instead of the lenses 131 and 132.

<Lenses 431 and 432>

The lens 431 is a toroidal lens having different powers in relation to the X direction and the Y direction. The lens 432 is a toroidal lens having different powers in relation to the X direction and the Y direction. The orientation of the lens 431 is adjusted such that the optical axis of the lens 431 is parallel to the Z axis. The orientation of the lens 432 is adjusted such that the optical axis of the lens 432 is parallel to the Z axis. The optical axes of the lenses 431 and 432 are the same axis. The lens 431 is placed near the mirror 122. The lens 432 is placed near the test surface 101. The light reflected off the mirror 122 enters the lens 431. The light exiting from the lens 431 enters the lens 432.

Figure 24:
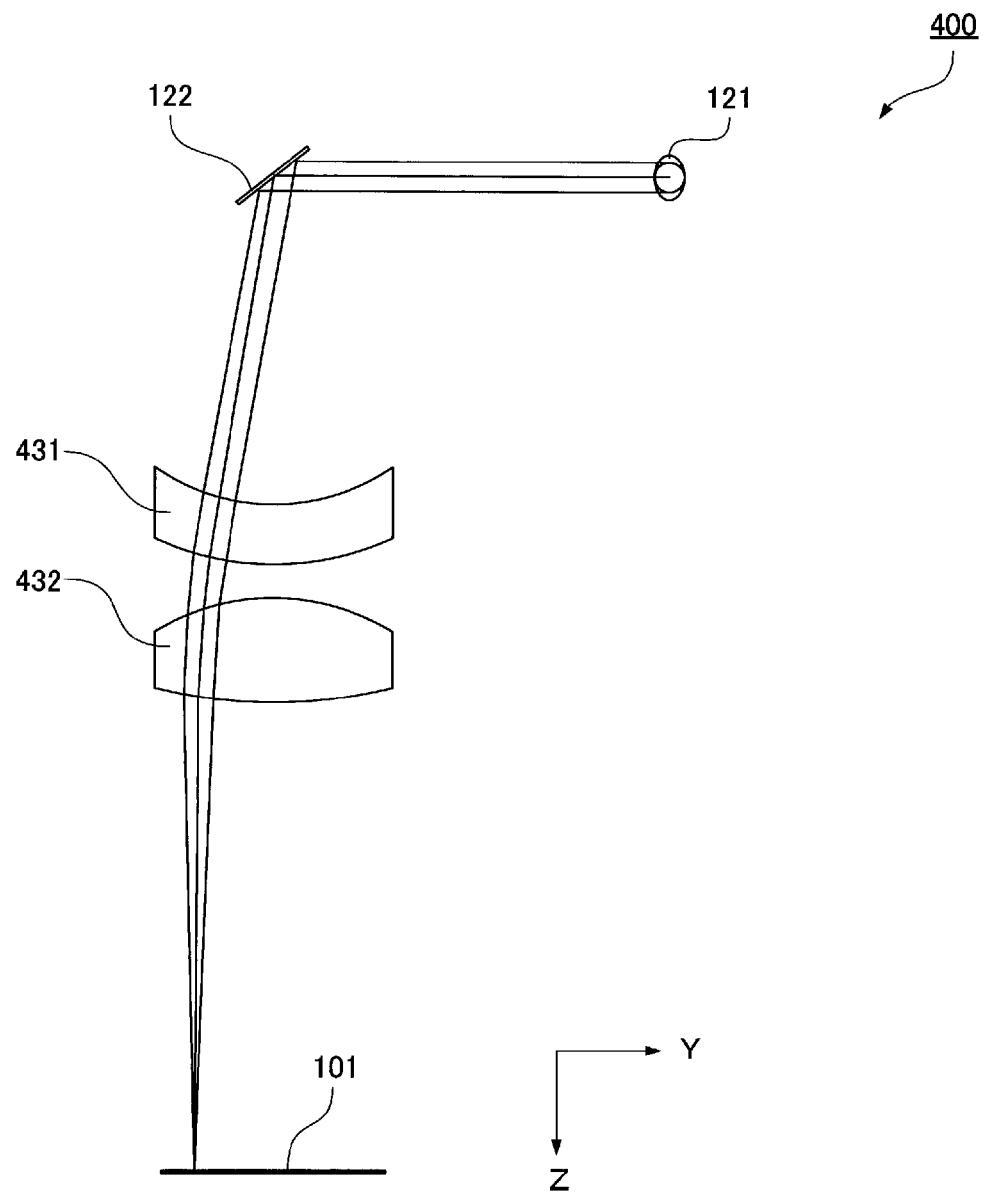
FIG. 24 shows the two-dimensional scanning device viewed in the X direction according to the fourth embodiment.
Figure 25:
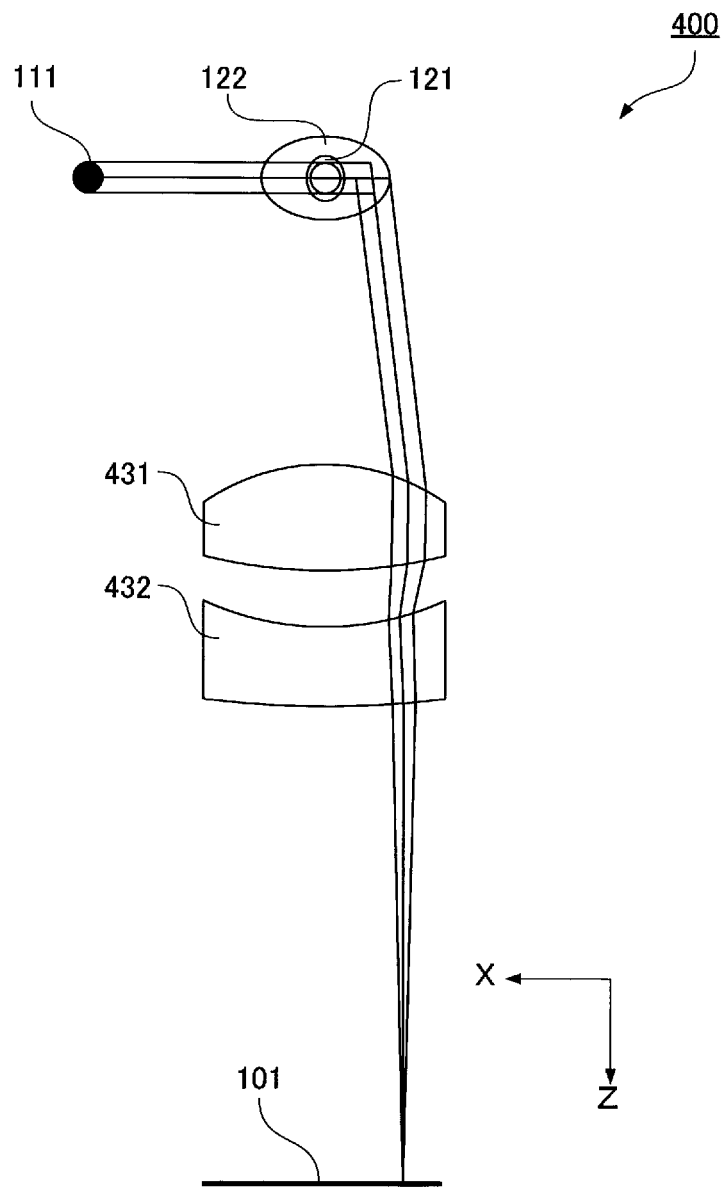
FIG. 25 shows the two-dimensional scanning device viewed in the Y direction according to the fourth embodiment.
Figure 30:
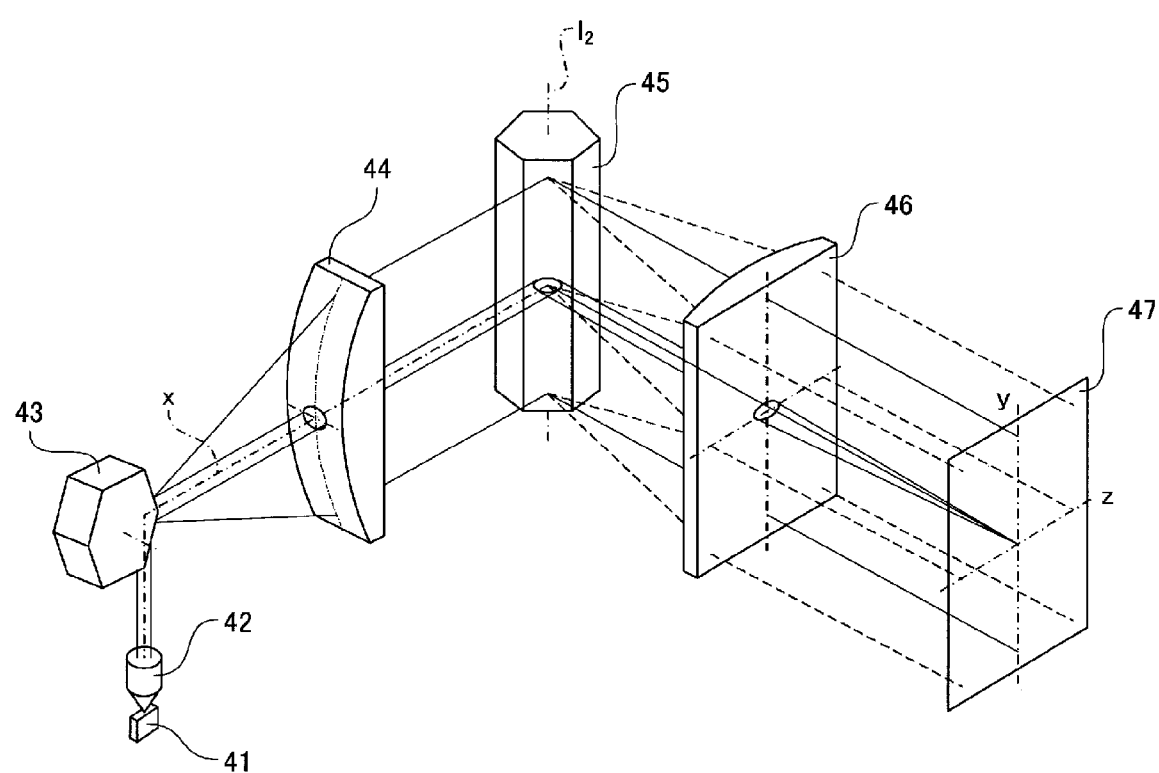
FIG. 30 is a schematic diagram showing a two-dimensional scanning optical system according to the related art.

As shown in FIGS. 24 and 25, the entrance surface of the lens 431 is curved convexly (positive) in the X direction and is curved concavely (negative) in the Y direction. With respect to the entrance surface of the lens 431, the curvature in the X direction and the Y direction are much the same.

The exit surface of the lens 431 is curved concavely (negative) in the X direction and is curved concavely (negative) in the Y direction. With respect to the exit surface of the lens 431, the curvature in the Y direction is larger than the curvature in the X direction.

The entrance surface of the lens 432 is curved concavely (negative) in the X direction and is curved convexly (positive) in the Y direction. With respect to the entrance surface of the lens 432, the curvature in the X direction is larger than the curvature in the Y direction.

The exit surface of the lens 432 is curved concavely (negative) in the X direction and is curved concavely (negative) in the Y direction. With respect to the exit surface of the lens 432, the curvature in the Y direction is larger than the curvature in the X direction.

EXAMPLE

Referring to FIG. 23 and so on, an example of the fourth embodiment will be described below. On the lens 431, the focal length f1x when the scanning direction is the X direction is 47.9 mm and the focal length f1y when the scanning direction is the Y direction is 213.3 mm. On the lens 432, the focal length f2x when the scanning direction is the X direction is −90.35 mm and the focal length f2y when the scanning direction is the Y direction is 85.96 mm.

On the optical system including the lenses 431 and 432, the focal length fx when the scanning direction is the X direction is 84.48 mm and the focal length fy when the scanning direction is the Y direction is 60 mm.

A distance between the center of the mirror 121 and the center of the mirror 122 is 10 mm.

The two-dimensional scanning device 400, which includes the optical system configured thus, is used to rotate the mirror 121 by ±3.4° around the rotation axis 123 and rotate the mirror 122 by ±4.8° around the rotation axis 124, so that a square range of 20 mm by 20 mm is scanned on the test surface 101.

FIG. 26 shows the specifications of optical elements constituting the two-dimensional scanning device 400. FIG. 27 shows the resultant values of Expressions (1) to (8) on the basis of calculations using the data of the table of specifications. A mirror distance Dm which affects the difference in the focal lengths fx and fy is 50 mm. A working distance WD which affects a retro ratio and a telephoto ratio is 60 mm. In the two-dimensional scanning device 400, owing to the values shown in FIG. 27, the telecentric condition, the image plane coincidence condition, and the beam spot condition are satisfied regardless of the scanning direction.

FIG. 28A shows a lateral aberration at coordinate [0,0] on the test surface 101 scanned in the Y direction on the two-dimensional scanning device 400. FIG. 28B shows a lateral aberration at coordinate [0,0] on the test surface 101 scanned in the X direction on the two-dimensional scanning device 400. FIG. 29A shows a lateral aberration at coordinate [−10,−10] on the test surface 101 scanned in the Y direction on the two-dimensional scanning device 400. FIG. 29B shows a lateral aberration at coordinate [−10,−10] on the test surface 101 scanned in the X direction on the two-dimensional scanning device 400. In these drawings, lateral aberrations are plotted in coordinates with grid lines drawn at intervals of 100 μm. As illustrated in the graphs of these drawings, the two-dimensional scanning device 400 has a sufficiently low aberration that does not adversely affect two-dimensional scanning.

Summary

In the fourth embodiment, the lenses 431 and 432 are toroidal lenses. Thus, a compact two-dimensional scanning device which obtains a two-dimensional image with little distortion and a high-precision resolution by two-dimensional scanning and has a simple configuration can be achieved.

Industrial Applicability

The present invention can be used as a two-dimensional scanning device which two-dimensionally scans a test surface, such as a diagnostic device and a laser beam machine.

The invention claimed is:

1. A two-dimensional scanning device for scanning a test surface in a first direction and a second direction orthogonal to the first direction,
the two-dimensional scanning device comprising:
a light source;
a scanning optical system to scan the test surface in the first direction and the second direction with light emitting from the light source;
a first lens having different powers in relation to the first direction and the second direction; and
a second lens having different powers in relation to the first direction and the second direction,
wherein the scanning optical system is placed between the light source and a lens group including the first lens and the second lens,
the lens group has an image-side telecentricity, and
following Expressions (1) and (2) are satisfied in the two-dimensional scanning device:

$$|f1x/f1y|<1 \qquad (1)$$

$$|f2x/f2y|>1 \qquad (2)$$

where f1x is a focal length of the first lens when the scanning direction is the first direction, f1y is a focal length of the first lens when the scanning direction is the second direction, f2x is a focal length of the second lens when the scanning direction is the first direction, and f1y is a focal length of the second lens when the scanning direction is the second direction.

2. The two-dimensional scanning device according to claim 1, wherein the first lens and the second lens are toroidal lenses.

3. The two-dimensional scanning device according to claim 2, wherein in the case where the test surface is scanned in one of the first direction and the second direction, the lens group acts as a telephoto-type optical system, and
in the case where the test surface is scanned in the other direction, the lens group acts as a retrofocus-type optical system.

4. The two-dimensional scanning device according to claim 1, wherein following Expression (6) is satisfied in the two-dimensional scanning device:

$$0.5<f1x/fx<1.4 \qquad (6)$$

where fx is a focal length of the lens group when the scanning direction is the first direction.

5. The two-dimensional scanning device according to claim 1, wherein the first lens and the second lens are cylindrical lenses.

6. The two-dimensional scanning device according to claim 5, wherein at least one of the first lens and the second lens is a lens in which at least one of an entrance surface and an exit surface is an aspheric surface.

7. The two-dimensional scanning device according to claim 5, wherein with respect to the first lens and the second lens, of the entrance surface and the exit surface, a surface having a large curvature is an aspheric surface.

8. The two-dimensional scanning device according to claim 1, wherein the scanning optical system includes a first mirror for scanning the test surface in the first direction and a second mirror for scanning the test surface in the second direction.

9. The two-dimensional scanning device according to claim 8, wherein following Expressions (3) to (5) are satisfied in the two-dimensional scanning device:

$$0.2<|fx-fy|/Dm<1.4 \qquad (3)$$

$$0.6<WD/fy<1.4 \qquad (4)$$

$$0.6<(D+WD)/fx<1.4 \qquad (5)$$

where fx is a focal length of the lens group when the scanning direction is the first direction,
fy is a focal length of the lens group when the scanning direction is the second direction,
Dm is a distance between the first mirror and the second mirror,
D is a distance between the exit surface of the first lens and the entrance surface of the second lens on an optical axis, and
WD is a distance from the exit surface of the second lens to the test surface on the optical axis.

10. The two-dimensional scanning device according to claim 9, wherein following Expression (7) is satisfied in the two-dimensional scanning device:

$$1.0<fx/fy<1.7 \qquad (7).$$

11. The two-dimensional scanning device according to claim 8, wherein following Expression (8) is satisfied in the two-dimensional scanning device:

$$|(1/f1x+1/f2x)-(1/f1y+1/f2y)|<0.02 \qquad (8).$$

* * * * *